United States Patent
Kosaka et al.

(10) Patent No.: US 9,197,809 B2
(45) Date of Patent: Nov. 24, 2015

(54) IMAGE PICKUP APPARATUS, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventors: Takashi Kosaka, Kawasaki (JP); Koji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/262,184

(22) Filed: Apr. 25, 2014

(65) Prior Publication Data
US 2014/0327811 A1 Nov. 6, 2014

(30) Foreign Application Priority Data

May 1, 2013 (JP) ................... 2013-096472
Jun. 24, 2013 (JP) ................... 2013-131460
Feb. 26, 2014 (JP) ................... 2014-035372

(51) Int. Cl.
*H04N 5/232* (2006.01)
*H04N 5/235* (2006.01)

(52) U.S. Cl.
CPC ......... *H04N 5/23212* (2013.01); *H04N 5/2351* (2013.01); *H04N 5/2353* (2013.01)

(58) Field of Classification Search
CPC ................................... H04N 5/23212
USPC ........................................ 348/345
See application file for complete search history.

(56) References Cited

U.S. PATENT DOCUMENTS

| | | | |
|---|---|---|---|
| 7,831,138 B2 * | 11/2010 | Nakahara | 396/121 |
| 2005/0264678 A1 * | 12/2005 | Butterworth | 348/345 |
| 2006/0140613 A1 * | 6/2006 | Aikawa | 396/133 |
| 2013/0021514 A1 * | 1/2013 | Kamimura | 348/340 |

FOREIGN PATENT DOCUMENTS

JP 2013-025107 A 2/2013

\* cited by examiner

*Primary Examiner* — Anthony J Daniels
(74) *Attorney, Agent, or Firm* — Cowan, Liebowitz & Latman, P.C.

(57) ABSTRACT

An image pickup apparatus includes an image pickup element configured to photoelectrically convert an optical image, and a controller configured to control a drive of a focus lens based on a signal outputted from the image pickup element and control a frame rate to drive the image pickup element, and the controller is configured to detect an in-focus position based on a signal outputted from the image pickup element which is driven at a first frame rate, and to switch the frame rate of the image pickup element to a second frame rate lower than the first frame rate while performing a first operation to drive the focus lens to the in-focus position.

24 Claims, 14 Drawing Sheets

PLAN VIEW

B-B CROSS-SECTIONAL VIEW

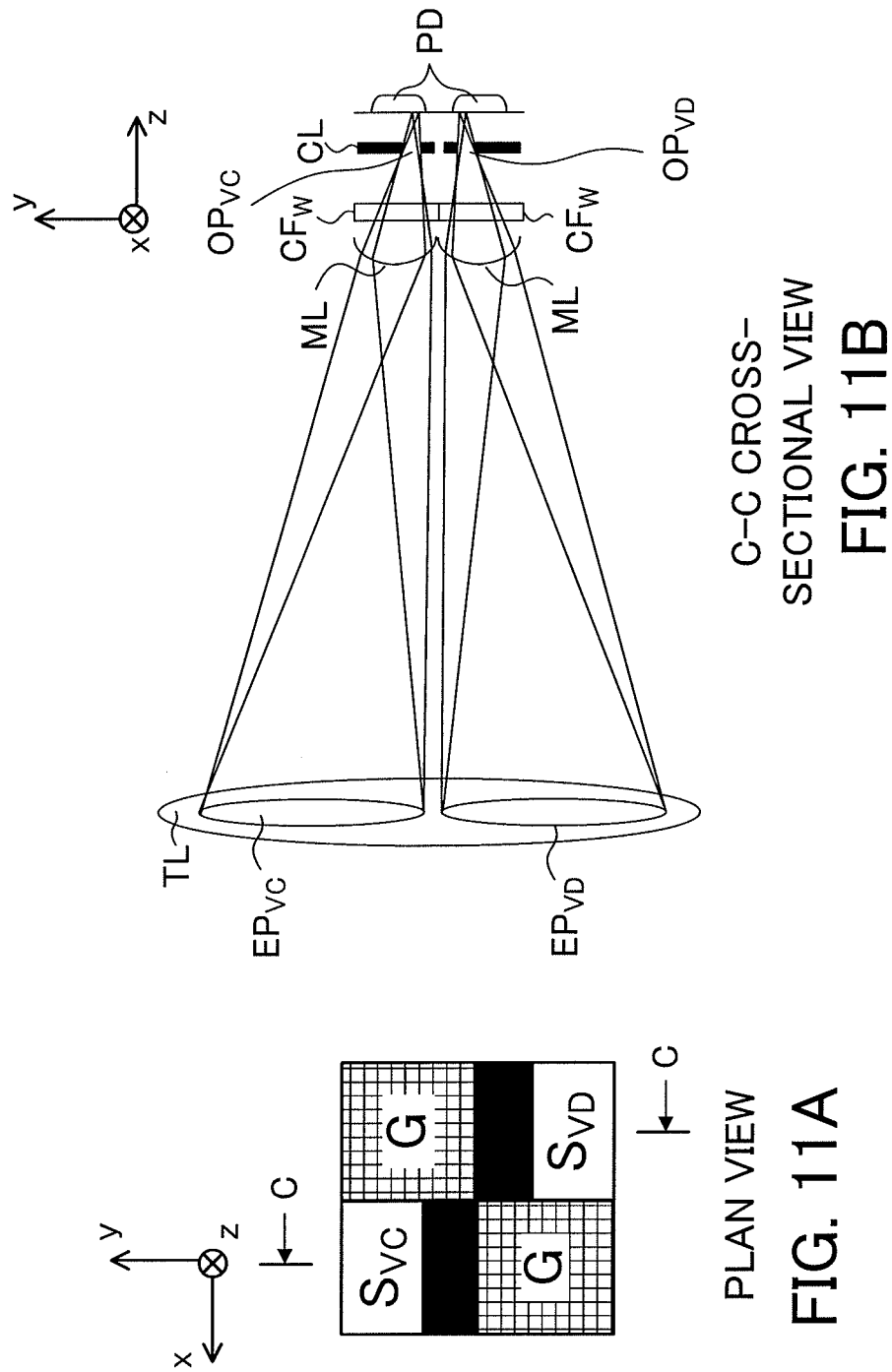

IMAGE PICKUP APPARATUS, METHOD OF CONTROLLING IMAGE PICKUP APPARATUS, AND NON-TRANSITORY COMPUTER-READABLE STORAGE MEDIUM

BACKGROUND OF THE INVENTION

1. Field of the Invention

The present invention relates to an image pickup apparatus which performs focus detection by a contrast method.

2. Description of the Related Art

Conventionally, image pickup apparatuses which have a live view function and perform auto focus detection (AF control) by a contrast method have been known. The AF control by the contrast method requires calculating contrast evaluation values while changing a focus position of a focus lens to determine a position at which a contrast evaluation value reaches a peak.

In order to increase in speed of the AF control by the contrast method, a configuration may be adopted in which a frame rate during the focus detection is switched to a high-speed frame rate to reduce a sampling cycle of a contrast evaluation value, thereby a focus lens is driven at higher speed for detection of the contrast evaluation value. In this configuration, a frame rate during the AF control is set higher than that set during a normal state, taking a processing load of a system (the image pickup system), a battery remaining time depending on consumption current, and other factors into consideration. Japanese Patent Laid-Open No. ("JP") 2013-25107 discloses an image pickup apparatus which performs the AF control with a frame rate being switched to 120 fps by pressing a release button halfway when the frame rate during live view is 60 fps and sets the switched frame rate to the original frame rate of 60 fps after completion of the AF control.

In order for an image pickup apparatus to start a shooting, it is typically required that the AF control be completed to cause a focus lens to be located at an optimum focus position and photometry processing to determine an exposure during the shooting be completed. Such photometry processing is required to be performed after an in-focus frame (a focus frame) is fixed in a multi-point AF or other mode in which a focus detection frame (an AF frame) to be used for focusing is not fixed.

However, the image pickup apparatus disclosed in JP 2013-25107 switches a frame rate from 120 fps to 60 fps after the AF control to set a normal live-view state when the release button is pressed all the way at once during the AF control. The image pickup apparatus then permits a shooting after performing photometry to determine an exposure set for the shooting. Since a frame rate switching typically requires a predetermined time, a focus state may still not be optimized from the viewpoint of a release time lag even when the AF control is performed at higher speed.

On the other hand, in a configuration designed to keep, for a predetermined time during the AF control, a state in which an original frame rate is switched to a high-speed frame rate, a battery life is shorter due to increase in consumption current and a live-view operation duration is shorter due to rise in temperature, compared with a configuration in which a frame rate is returned to a normal frame rate immediately after the AF control.

In addition, the image pickup apparatus disclosed in JP 2013-25107 is configured to start the focus detection by the contrast method after changing a frame rate from a low frame rate to a high frame rate. This makes it impossible to start the focus detection until completion of the frame rate change, which in turn requires a great deal of time for the focus detection.

SUMMARY OF THE INVENTION

The present invention provides an image pickup apparatus capable of performing high-speed shooting with suppressed consumption current and temperature rise, a method of controlling the image pickup apparatus, and a non-transitory computer-readable storage medium. The present invention also provides an image pickup apparatus capable of displaying a desired live view while performing high-speed focus detection, a method of controlling the image pickup apparatus, and a non-transitory computer-readable storage medium.

An image pickup apparatus as one aspect of the present invention includes an image pickup element configured to photoelectrically convert an optical image, and a controller configured to control a drive of a focus lens based on a signal outputted from the image pickup element and control a frame rate to drive the image pickup element, and the controller is configured to detect an in-focus position based on a signal outputted from the image pickup element which is driven at a first frame rate and switch the frame rate of the image pickup element to a second frame rate lower than the first frame rate while performing a first operation to drive the focus lens to the in-focus position.

A method of controlling an image pickup apparatus as another aspect of the present invention includes the steps of converting photoelectrically an optical image in an image pickup element, detecting an in-focus position based on a signal outputted from the image pickup element driven at a first frame rate, performing a first operation to drive a focus lens to the in-focus position, and switching a frame rate of the image pickup element to a second frame rate lower than the first frame rate while performing the first operation.

A non-transitory computer-readable storage medium as another aspect of the present invention stores a program which causes a computer to execute a process that includes the steps of converting photoelectrically an optical image in an image pickup element, detecting an in-focus position based on a signal outputted from the image pickup element driven at a first frame rate, performing a first operation to drive a focus lens to the in-focus position, and switching a frame rate of the image pickup element to a second frame rate lower than the first frame rate while performing the first operation.

Further features and aspects of the present invention will become apparent from the following description of exemplary embodiments with reference to the attached drawings.

BRIEF DESCRIPTION OF THE DRAWINGS

FIGS. 11A and 11B are a plan view and a sectional view, respectively, of a focus detection pixel of the image pickup element in the third and fourth embodiments.

DESCRIPTION OF THE EMBODIMENTS

Figure 1:
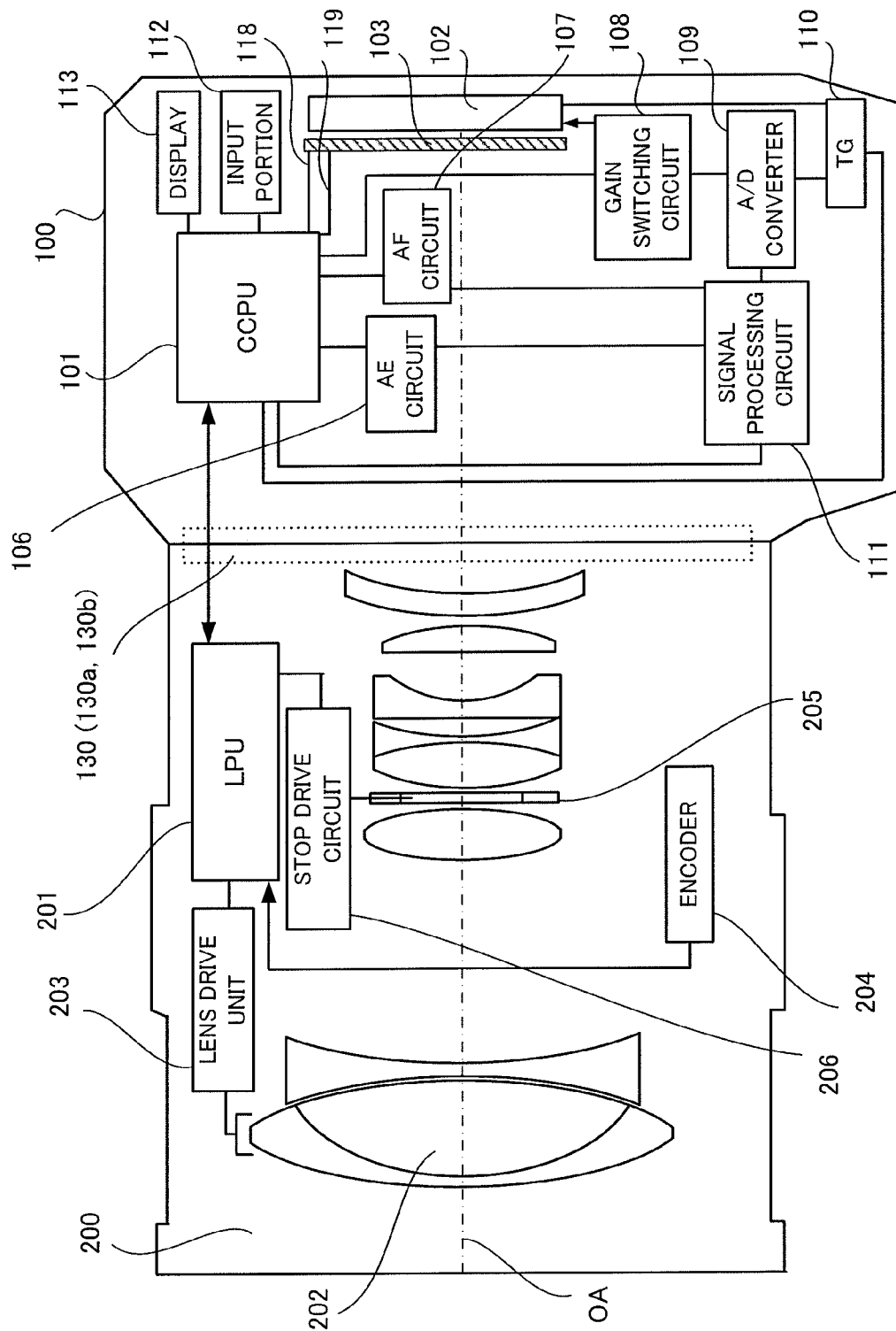
FIG. 1 is a block diagram illustrating the configuration of an image pickup system in first and second embodiments.

Exemplary embodiments of the present invention will be described below with reference to the accompanied drawings. In each of the drawings, the same elements will be denoted by the same reference numerals and the duplicate descriptions thereof will be omitted.

First Embodiment

First of all, referring to FIG. 1, the schematic configuration of an image pickup system (a camera system) in this embodiment will be described. FIG. 1 is a block diagram illustrating the configuration of the image pickup system. In FIG. 1, reference numeral 100 denotes an image pickup apparatus (a camera or an image pickup apparatus body), and reference numeral 200 denotes a lens unit (a lens apparatus or an interchangeable lens). As described above, the image pickup system of this embodiment includes the image pickup apparatus 100 and the lens unit 200 removably mounted on the image pickup apparatus 100. This embodiment is applicable also to an image pickup apparatus (an image pickup system) constituted by the lens unit 200 and the image pickup apparatus body which are integrated with each other.

The configuration and the operation of the image pickup apparatus 100 will be now described. A camera microcomputer 101 (a controller or a CCPU) is a system control circuit configured to control each element of the image pickup apparatus 100. The camera microcomputer 101 is configured to perform various controls of the image pickup system and various condition determinations as well. An image pickup element 102, which is constituted by a CCD, CMOS, or other sensor, includes an infrared cut filter, a low-pass filter, and the like. An object image (an optical image) is formed via a lens 202 (or a plurality of lenses) in the lens unit 200, and the object image formed via the lens 202 is imaged on the image pickup element 102. The image pickup element 102 photo-electrically converts the object image.

A shutter 103 closes during shot image reading to shield the image pickup element 102 from light and opens during live view or shooting to guide a ray to the image pickup element 102. The "live view" is a function which enables to check a shot image by sequentially outputting image signals continuously read from the image pickup element 102 on a display 113, such as a liquid crystal display, placed on the back surface of the image pickup apparatus 100 or on other location. The control circuit of the shutter 103 controls the shutter 103 based on a shutter drive signal 118 from the camera microcomputer 101. In this embodiment, the shutter 103 is a known focal-plane shutter. The control circuit of the shutter 103 controls a shutter drive magnet, which constitutes the focal-plane shutter, to cause a shutter curtain to travel, thereby performing an exposure operation. The shutter 103 also includes a photo interrupter configured to detect a position of a blade of the shutter 103 to detect a timing of shutter travel completion and the like. The photo interrupter is connected to the camera microcomputer 101 via a signal line 119 configured to transmit a detection signal.

A photometry circuit 106 (a photometry unit) performs a calculation in cooperation with a signal processing circuit 111 (a digital signal processing circuit) with respect to the image signal captured by the image pickup element 102 to perform photometry processing. That is, the photometry circuit 106 performs the photometry by using the signal obtained from the image pickup element 102. As described later, the photometry is performed based on the signal from the image pickup element 102 driven at a low frame rate.

A focus detection circuit 107 performs a calculation in cooperation with the signal processing circuit 111 with respective to an image signal captured by the image pickup element 102 to perform focus detection control (AF control). That is, the focus detection circuit 107 performs the focus detection by the contrast method based on the signal obtained from the image pickup element 102. As described later, the focus detection by the contrast method is performed based on a signal from the image pickup element 102 driven at a high frame rate.

A gain switching circuit 108 switches a gain of a signal (an amplification signal) of the image pickup element 102. The switching of the gain is controlled by the camera microcomputer 101 depending on a shooing condition or a user's input operation. An A/D converter 109 converts an amplified analog signal sent from the image pickup element 102 to a digital signal. A timing generator 110 (a TG) has a configuration to synchronize a timing of inputting the amplification signal of the image pickup element 102 and a timing of the conversion by the AD converter 109. The signal processing circuit 111 performs, depending on a parameter, image processing for the image data converted by the A/D converter 109 to the digital signal. The description of a storage unit such as a memory configured to store a processed image will be omitted.

A mount 130 configured to mount the lens unit 200 on the image pickup apparatus 100 includes a camera mount 130a located on the image pickup apparatus 100 and a lens mount 130b located on the lens unit 200. The mount 130 includes a communication terminal which enables data communication between the camera microcomputer 101 and a lens microcomputer 201, which is capable of performing the communication between the camera microcomputer 101 and the lens microcomputer 201. This communication allows the camera microcomputer 101 to determine a type and a state of the lens unit 200 mounted on the image pickup apparatus 100.

An input portion 112 includes a release button (an SW1 and an SW2), and a switch, a button, a dial, or the like to switch modes of a single shooting mode and a continuous shooting mode and is capable of inputting a setting of the image pickup apparatus 100 and the like from the outside. The display unit 113 includes a liquid crystal device, a light emitting device, or the like configured to display various set modes and other shooting information. In addition, the display unit 113 displays an image from the image pickup element 102 driven at a low frame rate as a live view.

Subsequently, the configuration and operation of the lens unit 200 will be described. Reference numeral 201 denotes the lens microcomputer (a controller or an LPU) configured to control the operation of each component of the lens unit 200. The lens microcomputer 201 performs a control of the lens unit 200 and various condition determinations. The lens 202, which is constituted by a plurality of lenses, includes a focus lens configured to perform focusing by moving in an optical axis direction. A lens drive unit 203 moves the focus lens of the lens 202 in a direction along an optical axis OA (an optical axis direction). The camera microcomputer 101 calculates a drive amount of the lens 202 based on an output of the focus detection circuit 107 of the image pickup apparatus 100.

An encoder 204 detects a position (position information) of the lens 202. The drive amount of the lens 202 calculated by the camera microcomputer 101 is communicated from the camera microcomputer 101 to the lens microcomputer 201. Then, the lens microcomputer 201 performs a drive control for the lens drive unit 203 by using the position information of the lens 202 and the drive amount calculated by the camera microcomputer 101. The lens drive unit 203 moves the focus lens to an in-focus position in such a manner. In the focus detection, the camera microcomputer 101 communicates a drive direction and a drive speed of the focus lens to the lens microcomputer 201 and performs a drive control suitable for the focus detection operation (focus control) for the focus lens. That is, the camera microcomputer 101 (the lens microcomputer 201) performs focus drive of the focus lens based on a detection result of the focus detection circuit 107.

A stop 205 is used for adjusting a light intensity. A stop drive circuit 206 drives the stop 205. The lens microcomputer 201 controls the stop drive circuit 206 to perform the drive control of the stop 205. A stop drive amount required to control the stop 205 is notified from the camera microcomputer 101 to the lens microcomputer 201 by communication. While a focal length of the lens 202 is fixed (a single focus) in this embodiment, applicable focal lengths are not limited to this and a focal length of the lens 202 may be variable as in the case of a zoom lens.

Figure 2:
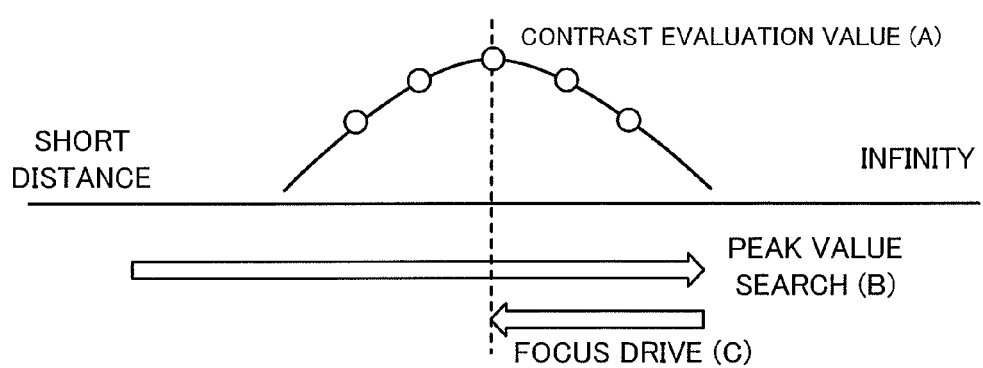
FIG. 2 is an explanatory diagram of an AF control in the first and second embodiments

Next, referring to FIG. 2, the AF control performed by the focus detection circuit 107 and the camera microcomputer 101 will be described. FIG. 2 is an explanatory diagram of the AF control (focus detection and focus drive) in this embodiment.

First, the focus detection circuit 107 receives, from the signal processing circuit 111, a contrast evaluation value (A) with respect to an image pickup signal (an image signal). The contrast evaluation value (A) is determined by the signal processing circuit 111 by extracting a high frequency component from the image pickup signal and then integrating the extracted high frequency component. In parallel with this, the camera microcomputer 101 communicates with the lens microcomputer 201 to drive the focus lens via the lens drive unit 203. The camera microcomputer 101 (the focus detection circuit 107) searches a position at which the contrast evaluation value reaches a peak (a peak position) in such a manner (performs a peak value search (B)). Upon determination of the peak position of the contrast evaluation value, the camera microcomputer 101 communicates with the lens microcomputer 201 to drive the focus lens toward the peak position (performs focus drive (C)).

That is, the focus detection circuit 107 obtains a contrast evaluation value (a focus signal) based on the signal from the image pickup element 102 while moving the focus lens. Then, the focus detection circuit 107 detects a position of the focus lens at which the contrast evaluation value reaches a peak (a position at which an in-focus state can be obtained). Subsequently, the camera microcomputer 101 performs the focus drive so as to move the focus lens to an in-focus position. The AF control completes when the above operations have been performed.

Next, the AF control and the photometry processing in the first embodiment of the present invention will be described.

Figure 3:
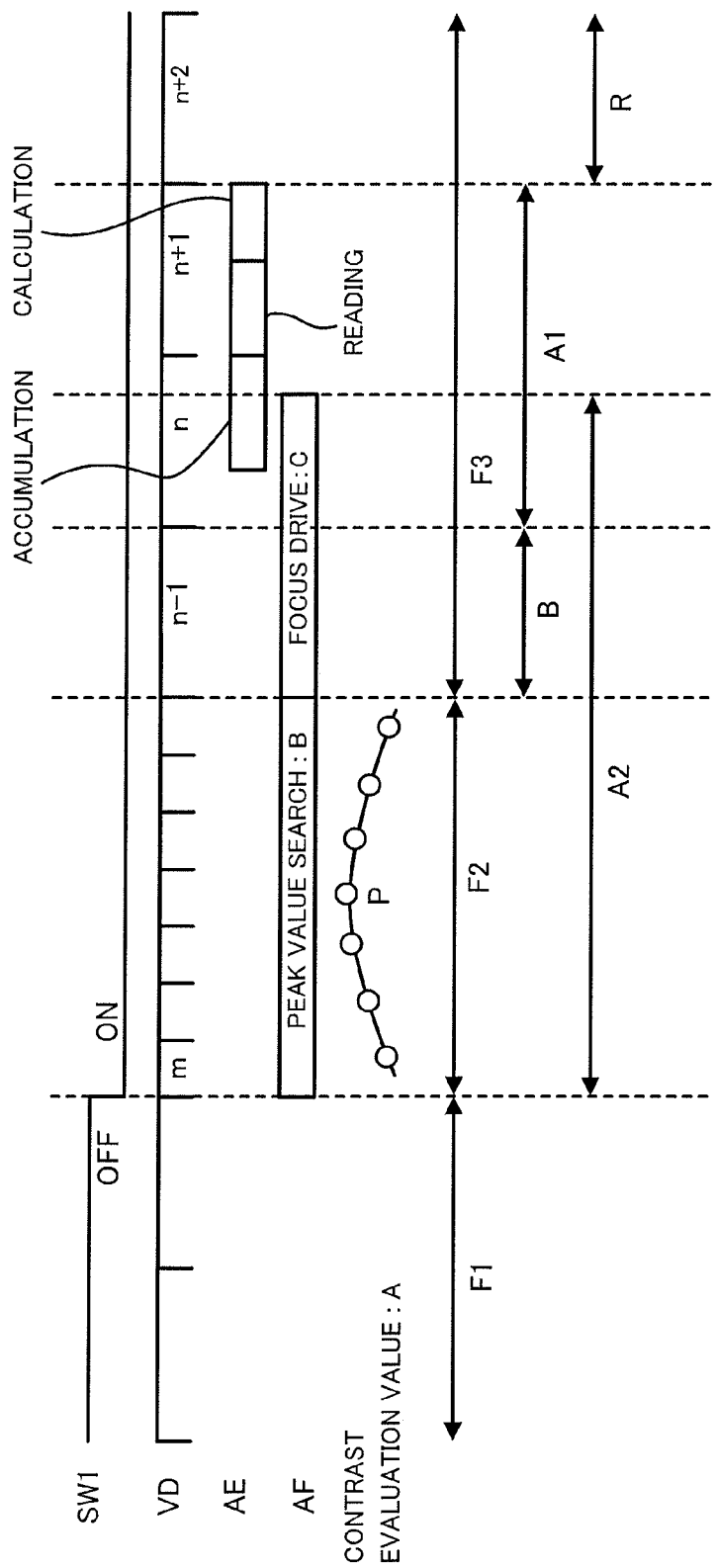
FIG. 3 is an explanatory diagram of operation timings of the AF control and the photometry processing in the first embodiment.

First, referring to FIG. 3, operation timings of the AF control and the photometry processing in this embodiment will be described. FIG. 3 is an explanatory diagram of the operation timings of the AF control and the photometry processing. In FIG. 3, symbol SW1 denotes a status (on or off) of the SW1 in which a shutter button is pressed halfway. Symbol VD denotes a vertical synchronization signal (a VD signal) generated by the timing generator 110 (the TG) that indicates a timing at which a pixel signal is read from the image pickup element 102, that is, a frame period. Symbol AE denotes a timing at which the photometry circuit 106 performs the photometry processing (i.e. accumulation, reading, and calculation). Symbol AF denotes a timing at which the focus detection circuit 107 performs the AF control (i.e. peak value search (B) and focus drive (C)).

In FIG. 3, a period F1 is a live-view operation period during a standby state (a period in which the SW1 is turned off). In the period F1, a frame rate (a low-speed frame rate or a low frame rate) defined by the vertical synchronization signal is 30 fps. In the period F1, a low-speed frame rate of 30 fps is set as a frame rate at which a long-time live-view operation can be continued, taking a consumption current of the image pickup apparatus 100, and a temperature rise in the image pickup element 102 or the signal processing circuit 111 into consideration. Applicable frame rates, however, are not limited to this and thus a frame rate other than 30 fps may be set as a low-speed frame rate.

When the SW1 is turned on by the half press of the shutter button included in the input portion 112, the camera microcomputer 101 switches a frame rate to a high-speed frame rate (a high frame rate) of 120 fps to start the AF control (frame (m)). In this situation, an operation to turn the SW1 on (a predetermined operation) can be rephrased as an operation to instruct shooting preparation or an operation to instruct focusing. In FIG. 3, a period F2 is a period in which a frame rate is 120 fps (a period in which a frame rate is set to a high-speed frame rate). In the period F2, the camera microcomputer 101 (the focus detection circuit 107) obtains a contrast evaluation value (A) at a frame period of high-speed frame rate while driving the focus lens. Obtaining a contrast evaluation value at a high-speed frame rate enables the focus lens to be driven at a higher speed for the peak value search (B). This allows a reduction in time required for the focus detection processing (contrast AF). While the high-speed frame rate set during the AF control is 120 fps in this embodiment, applicable frame rates are not limited to this. Any frame rate other than 120 fps may be set as long as it is higher than that set during the standby state (the period F1).

Upon completion of the peak value search (B) for the contrast evaluation values by the focus detection circuit 107, the camera microcomputer 101 returns the frame rate to 30 fps (the low-speed frame rate) as a frame rate set for the standby state. In FIG. 3, a period F3 is a period which starts from when the high-speed frame rate is changed to the low-speed frame rate (a period after completion of the peak value search (B)). In the period F3, the camera microcomputer 101 returns the frame rate to the low-speed frame rate (30 fps) and drives the focus lens toward a position which represents a peak P of the contrast evaluation value (A). In FIG. 3, a period A2 represents a period of a series of AF control operations including the peak value search (B) and the focus drive (C). At a right-end timing in the period A2, the AF control completes, satisfying a shooting condition for the AF.

Upon switching of the frame rate to 30 fps which is the low-speed frame rate, the photometry circuit 106 starts the photometry processing before completion of the AF control (in the period A2). When switching the frame rate, several processing such as settings of an accumulation time for the photometry and a gain for reading are required. Therefore, the processing required to switch the frame rate is performed in a period B. After that, the photometry circuit 106 performs the photometry processing in the period A1. The photometry circuit 106 reads pixel data accumulated in a frame (n) and also performs a calculation in a subsequent frame (n+1). The camera microcomputer 101 determines an exposure parameter for shooting based on a result of the calculation. The photometry processing completes at the right-end timing in the period A1 and then the exposure parameter for shooing is prepared in a frame (n+2). Thus, the condition for the AE control can be satisfied.

As described above, the camera microcomputer 101 becomes ready for a shooting upon satisfaction of both of the shooting condition for the AF control and that for the AE control. In FIG. 3, a period R represents a period in which a shooting can be performed. When the SW2, which represents the full press of the shutter button that is included in the input portion 112 and not illustrated in the drawing, is turned on at a timing earlier than a starting point (a left end) of the period R, a shooting operation starts at a timing indicated by the starting point of the period R. On the other hand, when the SW2 is turned on in the period R, the shooting operation starts immediately.

Figure 4:
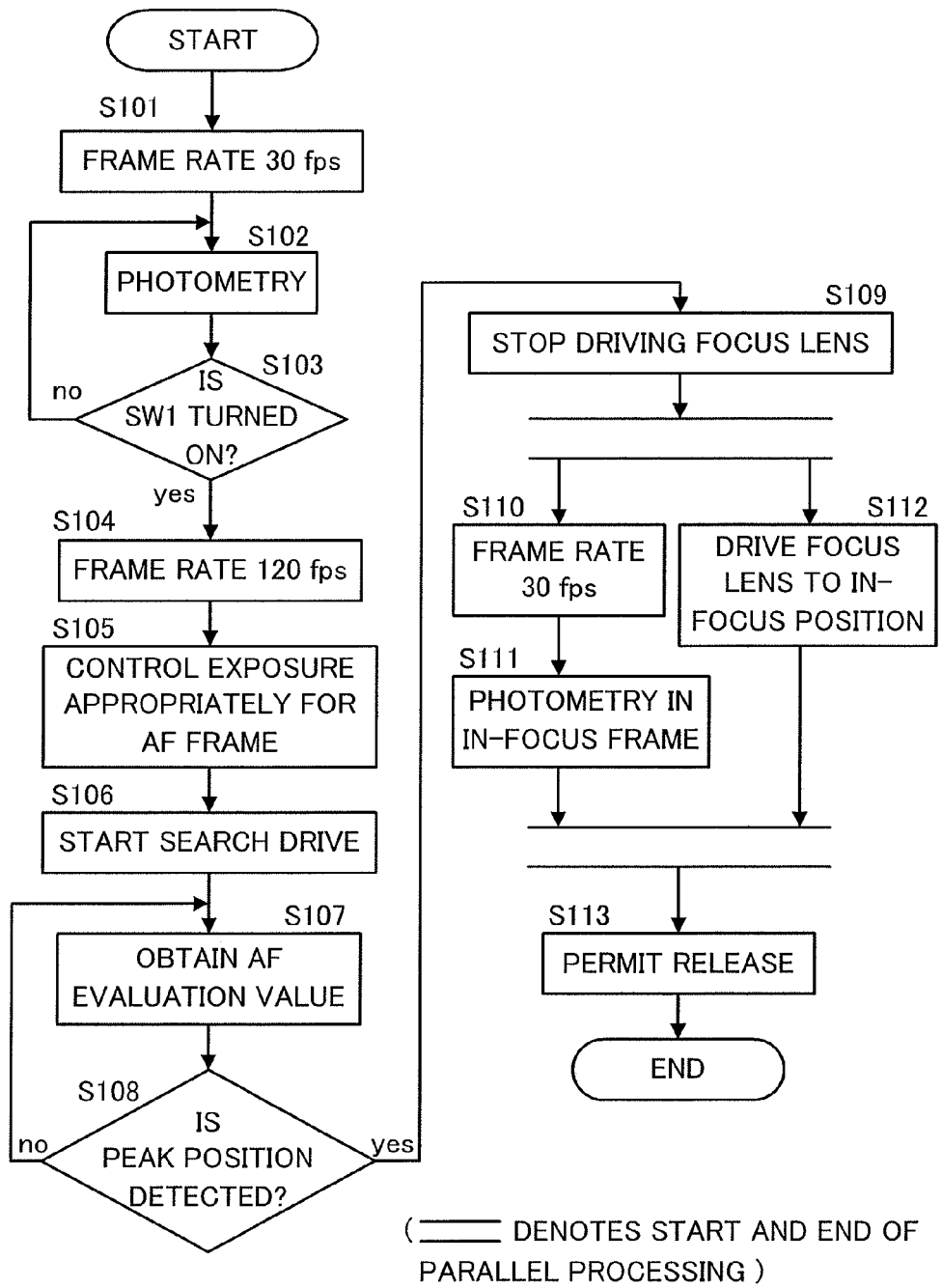
FIG. 4 is a flowchart of the AF control and the photometry processing in the first embodiment.

Subsequently, referring to FIG. 4, the flow of the AF control and the photometry processing in this embodiment will be described. FIG. 4 is a flowchart illustrating the AF control and the photometry processing. Each step of FIG. 4 is performed mainly by the photometry circuit 106 or the focus detection circuit 107 based on a command (an instruction) of the camera microcomputer 101.

First, at step S101, the camera microcomputer 101 sets a low-speed frame rate (30 fps in this embodiment) applied during the standby state as a frame rate for the live view. In addition, the camera microcomputer 101 makes settings required for the timing generator 110.

Subsequently, at step S102, the photometry circuit 106 performs the photometry. The photometry circuit 106 is capable of performing the photometry in every frame in synchronization with the vertical synchronization signal (the VD signal). This embodiment, however, is not limited to this and the photometry circuit 106 may be configured so as to periodically (cyclically) perform the photometry processing, for example, only once in several frames, taking a processing load of the system (the image pickup apparatus) into consideration.

Subsequently, at step S103, the camera microcomputer 101 determines whether or not the SW1 is turned on. When the camera microcomputer 101 determines that the SW1 is off, it repeats step S102 while waiting for an input of the shutter button. On the other hand, when the camera microcomputer 101 determines that the SW1 is turned on, the flow proceeds to step S104.

Subsequently, at step S104, the camera microcomputer 101 performs a frame rate switching, that is, a switching from a low-speed frame rate (a low frame rate) to a high-speed frame rate (a high frame rate). In this embodiment, the camera microcomputer 101 performs the switching from a frame rate of 30 fps to a frame rate of 120 fps. The switching of the low-speed frame rate to the high-speed frame rate in such a manner shortens the contrast evaluation value sampling period, which enables the focus lens to be driven at higher speed for the peak value search. This allows a reduction in processing time of the contrast AF.

After the switching to the high-speed frame rate, at step S105, the camera microcomputer 101 performs an AF exposure control such that an appropriate exposure is achieved for an AF frame (the periphery of an AF frame) selected by a user. The AF exposure control is performed in the frame (m) of the VD signal illustrated in FIG. 3. More specifically, the camera microcomputer 101 determines, based on a result of the photometry performed in the period F1, whether or not the appropriate exposure is achieved for blocks adjacent to the AF frame. When the camera microcomputer 101 determines that the exposure for the blocks is different by 1EV or more from the appropriate exposure, it performs the exposure control (the AE control). The exposure control may be performed by using any of an accumulation time, a read gain, and a stop of the lens unit. This causes a contrast evaluation value for the focus detection to be output as a value which has an appropriate level even when an object to be focused is darker compared with other regions in a screen. On the other hand, during the standby state, the AE control is performed taking a brightness of the entire screen into consideration. This may result in a difference between an exposure for the live view during the standby state and an exposure during the AF processing.

Subsequently, at step S106, the camera microcomputer 101 starts a search drive, that is, a peak search for contrast evaluation values. Then, at step S107, the focus detection circuit 107 obtains a contrast evaluation value (an AF evaluation value). In the search drive, the camera microcomputer 101 moves the focus lens while obtaining the contrast evaluation value and detects a position of the focus lens at which the contrast evaluation value reaches a peak (a peak position of the focus lens). After that, at step S108, the camera microcomputer 101 determines whether or not the focus detection circuit 107 detects the position of the focus lens at which the contrast evaluation value (the AF evaluation value) reaches the peak. When the camera microcomputer 101 determines that the focus detection circuit 107 does not detect the peak position of the focus lens, it repeats step S107 until the focus detection circuit 107 detects the peak position. On the other hand, when the camera microcomputer 101 determines that the focus detection circuit 107 detects the peak position of the focus lens, the flow proceeds to step S109. At step S109, the camera microcomputer 101 stops the drive of the focus lens for the peak search started at step S106.

Subsequently, the camera microcomputer 101 performs, in parallel, a frame rate switching at step S110 and a focus dive (the drive of the focus lens to an in-focus position) at step S112. That is, the camera microcomputer 101 switches a frame rate in the focus drive. At step S110, the camera microcomputer 101 changes the high-speed frame rate (120 fps) to a normal frame rate that is set for the live view (the low-speed frame rate: 30 fps). In addition, the camera microcomputer 101 returns a status of the AF exposure control performed at step S105 to an original status while changing the frame rate. For instance, the camera microcomputer 101 stores, at step S105, an exposure control value (an exposure control parameter) set before the change to the AF exposure control in a memory (a storage unit) located inside the camera microcomputer 101. Then, at step S110, the camera microcomputer 101 changes the exposure control parameter to be used in the AF exposure control to the exposure control parameter stored in the memory. This embodiment, however, is not limited to this and other methods may be used to change an exposure control status.

After the camera microcomputer 101 changes the frame rate to the low-speed frame rate (30 fps), the photometry circuit 106 performs the photometry processing at step S111. In this embodiment, the photometry circuit 106 performs evaluation photometry by weighting a focus detection region used for the detection of an in-focus frame (an in-focus position), i.e. the photometry circuit 106 performs the photometry processing based on a signal corresponding to the focus detection region. This embodiment, however, is not limited to this and the photometry circuit 106 may perform averaged photometry in which the entire screen is averaged. Alternatively, if a photometry method can be selected by a user, the photometry circuit 106 may perform the photometry according to the photometry method set by the user. The camera microcomputer 101 calculates the exposure parameters for still image shooting (e.g. TV, AC, ISO) and stores these values in the memory (the storage unit) located inside the camera microcomputer 101 to perform the exposure control for the still image shooting based on a detected photometry result. The completion of the photometry processing at step S111 leads to satisfying the shooting condition for the AE control.

On the other hand, at step S112, the camera microcomputer 101 drives the focus lens to a position at which the contrast evaluation value reaches a peak (an in-focus position). The completion of the AF control at step S112 leads to satisfying the shooting condition for the AF control.

After completion of the photometry processing at step S111 and the AF control at step S112, the camera microcomputer 101 permits, at step S113, to accept the SW2, which represents the full press of the shutter button included in the input portion 112 (release permission). This enables to perform a shooting at any timing not sooner than that timing. That is, the camera microcomputer 101 completes the photometry processing by the photometry circuit 106 and then performs the control such that a shooting operation can be performed (permits shooting processing). During the shooting, the camera microcomputer 101 (the photometry circuit 106) can perform an appropriate exposure control by using the exposure control parameters stored in the memory at step S111.

In this embodiment, the timing generator 110 switches a frame rate of the image pickup element 102 from the high-speed frame rate to the low-speed frame rate in parallel with the drive of the focus lens by the camera microcomputer 101 to an in-focus position. Subsequent to the frame rate switching, the photometry circuit 106 performs the photometry processing based on a signal from the image pickup element 102. Preferably, the photometry circuit 106 accumulates the signal from the image pickup element 102 for the exposure control after the focus detection while the camera microcomputer 101 drives the focus lens to the in-focus position (a frame (n) of FIG. 3).

Further preferably, when the SW1 of the input portion 112 is turned on while the image pickup element 102 is driven at the low-speed frame rate, the timing generator 110 switches the low-speed frame rate to the high-speed frame rate to drive the image pickup element 102. Upon detection of the in-focus position, the timing generator 110 switches the high-speed frame rate to the low-speed frame rate to drive the image pickup element 102.

This embodiment performs the frame rate switching and the photometry processing for the AE control in parallel with the focus drive of the focus lens in the AF control, which enables a high-speed shooting operation (reduction in time lag) with suppressed consumption current and temperature rise.

Second Embodiment

Next, AF control and photometry processing in the second embodiment of the present invention will be described.

There are various interchangeable lenses (the lens unit 200) possible to be employed as an interchangeable lens system. In addition, lens units which change an image magnification of an object by a focusing operation are known. A change in the image magnification causes a change in a size of an object image on an imaging plane near the center of the screen, and a change in the size and a movement in a position of the object image at the periphery of the screen.

In the first embodiment, the configuration has been described in which the frame rate switching and the photometry processing are performed in the focus drive of the image pickup lens. When a lens unit whose image magnification significantly varies is used in the configuration of the first embodiment, performing the photometry during the focus drive of the focus lens is likely to derive a photometry result different from that derived in an in-focus state. Thus, in this embodiment, a configuration will be described in which a frame rate is switched during the focus drive of the image pickup lens and the photometry is performed after the focus drive.

Figure 5:
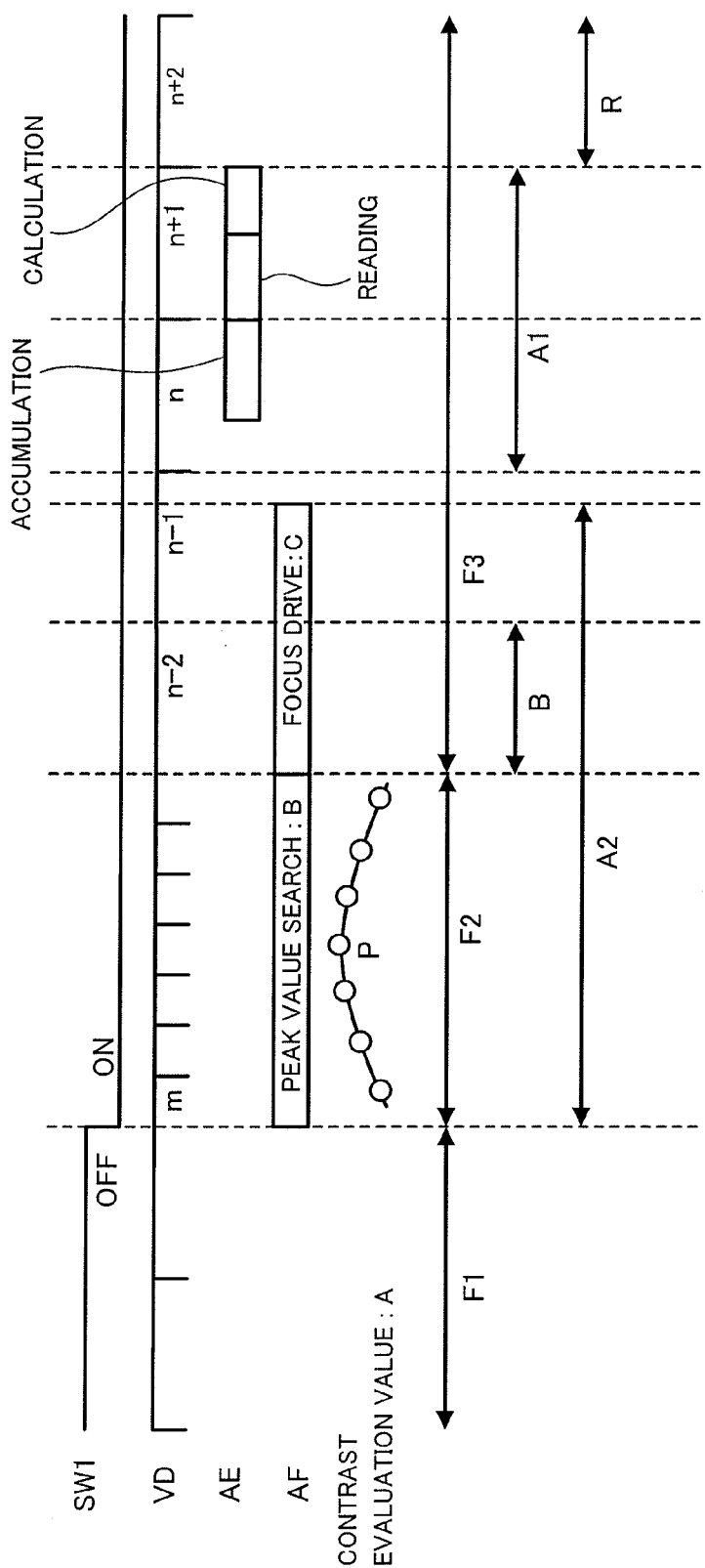
FIG. 5 is an explanatory diagram of operation timings of the AF control and the photometry processing in the second embodiment.

First, referring to FIG. 5, operation timings of the AF control and the photometry processing in this embodiment will be described. FIG. 5 is an explanatory diagram of the operation timings of the AF control and the photometry processing. In FIG. 5, a description for the same parts as those of the first embodiment (FIG. 3) will be omitted.

In FIG. 5, upon completion of the frame rate switching, that is, at a right-end timing in a period B, the image pickup apparatus comes into a state in which it can start the photometry. In this embodiment, the start of the photometry processing, however, is delayed in order to avoid an influence of change in image magnification due to the focus drive of the focus lens. This embodiment, however, is not limited to this. For instance, the image pickup apparatus may be configured such that the photometry processing is performed in each frame subsequent to a frame (n−1) and a result thereof is not used for determining exposure control parameters.

After completion of the focus drive in the AF control, that is, in a frame (n) following a period A2, the photometry circuit 106 starts the photometry processing. The photometry circuit 106, in a frame (n+1), reads pixel data accumulated in the frame (n) and performs a calculation for the pixel data to determine the exposure control parameters for shooting. The photometry processing completes at an end-point (right-end) timing of the period A1 and the exposure control parameters for shooting are prepared in frames subsequent to a frame (n+2). This leads to satisfying a shooting condition for the AE control. Upon completion of this series of processing, the image pickup system comes into a state in which it can perform the shooting (a period R).

Figure 6:
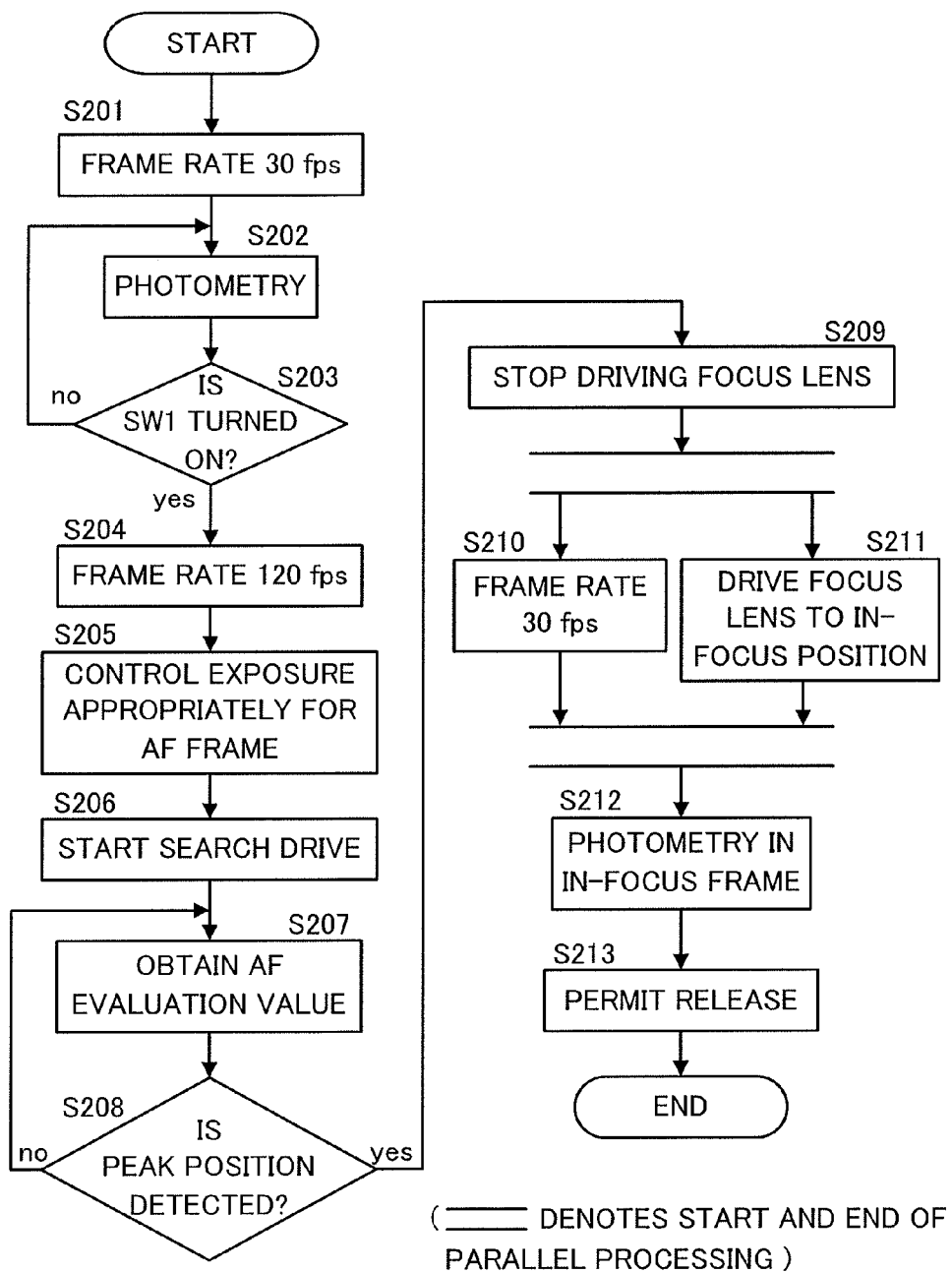
FIG. 6 is a flowchart of the AF control and the photometry processing in the second embodiment.

Next, referring to FIG. 6, the flow of the AF control and the photometry processing in this embodiment will be described. FIG. 6 is a flowchart illustrating the AF control and the photometry processing. Each step of FIG. 6 is performed mainly by the photometry circuit 106 or the focus detection circuit 107 based on a command (an instruction) of the camera microcomputer 101. Since steps S201 to S209 of FIG. 6 are the same as steps S101 to S109 of FIG. 4 described in the first embodiment, respectively, the description thereof will be omitted.

At step S209 of FIG. 6, the camera microcomputer 101 stops the drive of the focus lens for the peak value search started at step S206. Subsequently, the camera microcomputer 101 performs a frame rate switching at step S210 and a focus drive at step S211 (the drive of the focus lens to an in-focus position) in parallel. That is, the camera microcomputer 101 switches a frame rate during the focus drive. Since steps S210 and S211 of FIG. 6 are the same as steps S110 and S112, respectively, the detailed description thereof will be omitted.

After completion of the frame rate change at step S210 and the AF control at step S211, the photometry circuit 106 performs the photometry processing at step S212. After completion of the photometry processing at step S212 (and the AF control at step S211), the camera microcomputer 101 permits, at step S213, to accept the SW2, which represents the full press of the shutter button included in the input portion 112 (release permission). This enables to perform a shooting at any timing not sooner than that timing (the camera microcomputer 101 permits shooting processing). During shooting, the camera microcomputer 101 (the photometry circuit 106) can perform an appropriate exposure control by using the exposure control parameters stored in the memory at step S212.

As described above, in this embodiment, the photometry circuit 106 performs the photometry processing based on a signal from the image pickup element 102 after the camera microcomputer 101 completes the focus drive of the focus lens.

In this embodiment, the frame rate switching is performed in parallel with the focus drive of the focus lens in the AF control and the photometry processing is performed upon completion of the focus drive. This enables a high-speed shooting operation (reduction in time lag) with suppressed consumption current and temperature rise while reducing an influence of a change in image magnification.

Third Embodiment

Figure 7:
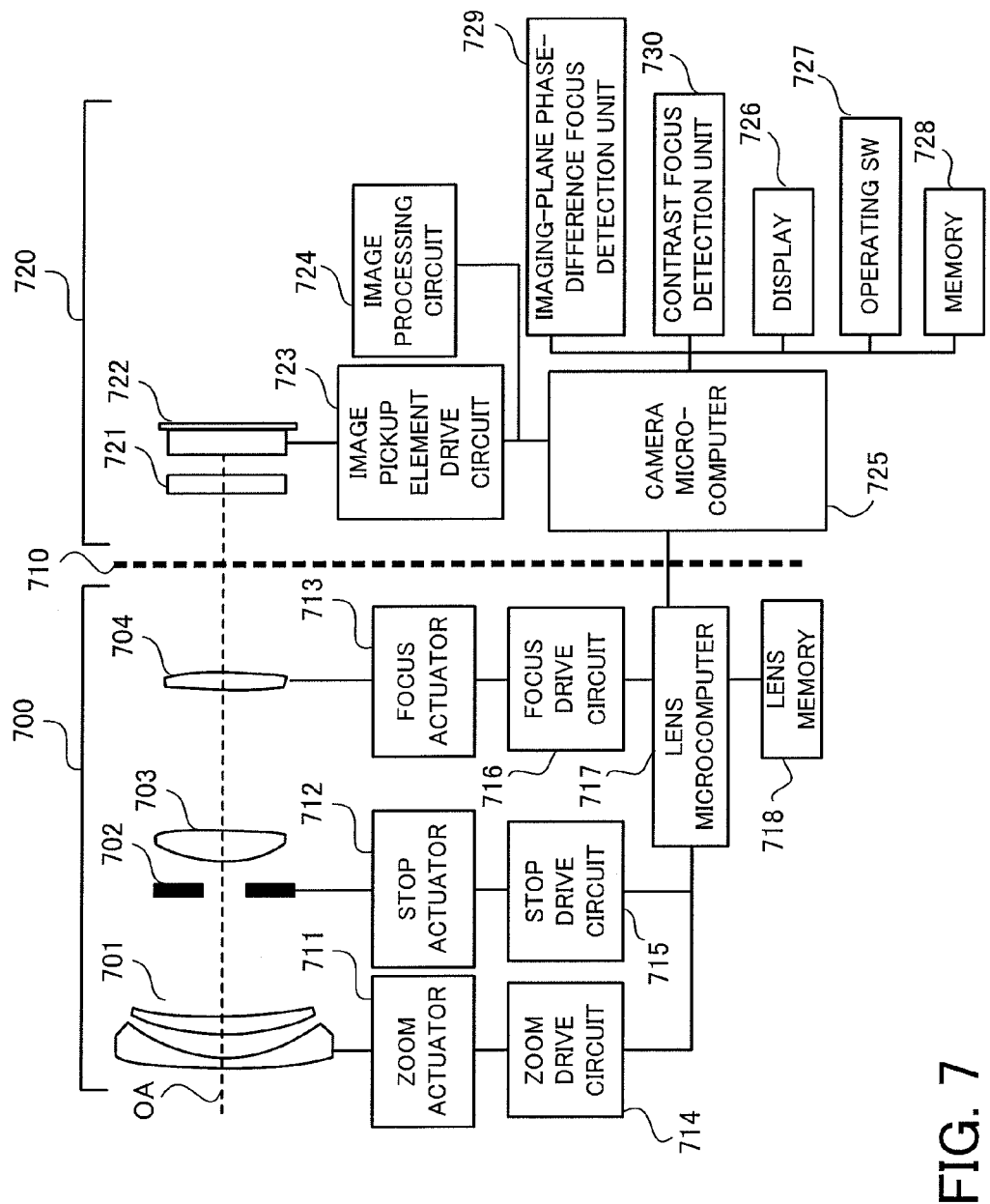
FIG. 7 is a block diagram illustrating the configuration of an image pickup apparatus (an image pickup system) in a third embodiment.

Next, referring to FIG. 7, the configuration of an image pickup apparatus in the third embodiment of the present invention will be described. FIG. 7 is a block diagram illustrating the configuration of the image pickup apparatus in the third embodiment. While, in this embodiment, an image pickup system will be described in which a lens unit 700 (a lens apparatus) is removably attached to a camera body 720 as the image pickup apparatus, applicable configurations are not limited to this. This embodiment is applicable also to an image pickup apparatus constituted by the camera body 720 and the lens unit 700 integrated with each other.

In the lens unit 700 of FIG. 7, a first lens unit 701 is disposed at a front end of the lens unit 700 and held movably forward and backward in a direction along an optical axis OA (an optical axis direction). A stop 702 adjusts light intensity during shooting by adjusting its opening diameter. The stop 702 and a second lens unit 703 move forward and backward in the optical axis direction in an integrated manner and achieve a zoom function in conjunction with the forward and backward movement of the first lens unit 701. A third lens unit 704 (a focus lens) performs focusing by moving forward and backward in the optical axis direction.

A zoom actuator 711 drives the first lens unit 701 and the second lens unit 703 to move forward and backward in the optical-axis direction to perform a zoom operation. A stop actuator 712 includes a stepping motor and the like. A focus actuator 713 drives the third lens unit 704 to move forward and backward in the optical axis direction to perform the focusing. A zoom drive circuit 714 drives the zoom actuator 711 in response to a zoom operation by a user. A stop drive circuit 715 drives the stop actuator 712 to control an opening of the stop 702. A focus drive circuit 716 performs a drive control of the focus actuator 713 based on a focus detection result and drives the third lens unit 704 to move forward and backward in the optical axis direction to perform the focusing.

A lens microcomputer 717 (a controller) performs all calculations and controls for the lens unit 700. The lens microcomputer 717 controls the zoom drive circuit 714, the stop drive circuit 715, the focus drive circuit 716, and a lens memory 718. In addition, the lens microcomputer 717 detects a current position of each lens unit and notifies a camera microcomputer 725 of lens position information in response to a command (an instruction) from the camera microcomputer 725. The lens memory 718 stores optical information required for auto focusing. The lens unit 700 is attached to the camera body 720 via a mount 710.

In the camera body 720, an optical low-pass filter 721 is an optical element to reduce a false color or a moire of a shot image. An image pickup element 722 configured to photo-electrically convert an object image (an optical image) includes a CMOS sensor (or a CCD sensor) and a peripheral circuit thereof. In the image pickup element 722, one photoelectric conversion element is placed on each light receiving pixel that has m pixels in a horizontal direction and n pixels in a vertical direction, and focus detection pixel lines are discretely arranged.

An image pickup element drive circuit 723 (a drive unit) controls an image pickup operation of the image pickup element 722, and performs A/D conversion on an image signal output from the image pickup element 722 to send a digital image signal to the camera microcomputer 725. In addition, the image pickup element drive circuit 723 switches a frame rate (a drive frame rate) of the image pickup element 722 in response to a command (an instruction) of the camera microcomputer 725.

An image processing circuit 724 performs various image processing such as gamma conversion, color interpolation, and JPEG compression for the image signal output from the image pickup element 722. A display 726 (a display unit) such as an LCD displays information on a shooting mode of the camera body 720, a pre-view image before shooting and an image to be checked after shooting, an in-focus-state display image at the time of the focus detection, and the like. In addition, the display 726 displays an image sent from the image pickup element 722 driven at a low-speed frame rate (a low frame rate) as a live view. An operating SW 727 (an operating switch group) includes a power switch, a release (shooting trigger) switch, a zoom operation switch, a shooting mode selection switch, and the like. In this embodiment, the operating SW further includes an AF start button to perform the auto focusing (AF control).

A removable memory 728 (a flash memory) records a shot image. An imaging-plane phase-difference focus detection unit 729 performs focus detection by a phase difference method by using a signal obtained from the focus detection pixel of the image pickup element 722. A contrast focus detection unit 730 performs focus detection processing by a contrast method by using a contrast evaluation value generated from a high frequency component of an image obtained by the image processing circuit 724. In this embodiment, the contrast focus detection unit 730 performs the focus detection by the contrast method while the image pickup element drive circuit 723 drives the image pickup element 722 at a high-speed frame rate (a high frame rate).

The camera microcomputer 725 (a controller) performs all calculations and controls in the camera body 720. The camera microcomputer 725 controls the image pickup element drive circuit 723, the image processing circuit 724, the display 726, the operating SW 727, the memory 728, the imaging-plane phase-difference focus detection unit 729, and the contrast focus detection unit 730. The camera microcomputer 725 communicates with the lens microcomputer 717 via a signal line of the mount 710 to send a request for obtaining the lens position information and for driving each lens at a predetermined drive amount to the lens microcomputer 717. The camera microcomputer 725 is capable of obtaining optical information unique to each lens unit 700 (an interchangeable lens). The camera microcomputer 725 includes a ROM configured to store a program to control an operation of the camera body 720, a RAM configured to store a variable, and an EEPROM (electrically erasable programmable read-only memory) configured to store various parameters. Moreover, the camera microcomputer 725 performs focus detection processing described later (control of the image pickup apparatus) according to the program stored in the ROM.

In this embodiment, the image pickup element 722 includes an image pickup pixel and a focus detection pixel. The imaging-plane phase-difference focus detection unit 729 performs the focus detection by the phase difference method (imaging-plane phase-difference AF) based on an image shift amount of a pair of images formed on the focus detection pixels by light beams which pass through pupil regions (divided pupil regions) different from each other.

Next, referring to FIGS. 9A and 9B to 12, the imaging-plane phase-difference AF will be described. FIGS. 9A and 9B to 11A and 11B are diagrams explaining the configurations of the image pickup pixel and the focus detection pixel. This embodiment adopts a Bayer array constituted by repetition of 4 (2×2) pixels, in which two pixels having a spectral sensitivity to G (green) are arranged at two diagonal pixel positions and one pixel having a spectral sensitivity to R (red) and one pixel having a spectral sensitivity to B (blue) are arranged at the other two pixel positions. In the Bayer array, the focus detection pixels having a configuration described later are arranged discretely according to a predetermined rule.

Figures 9A, 9B:
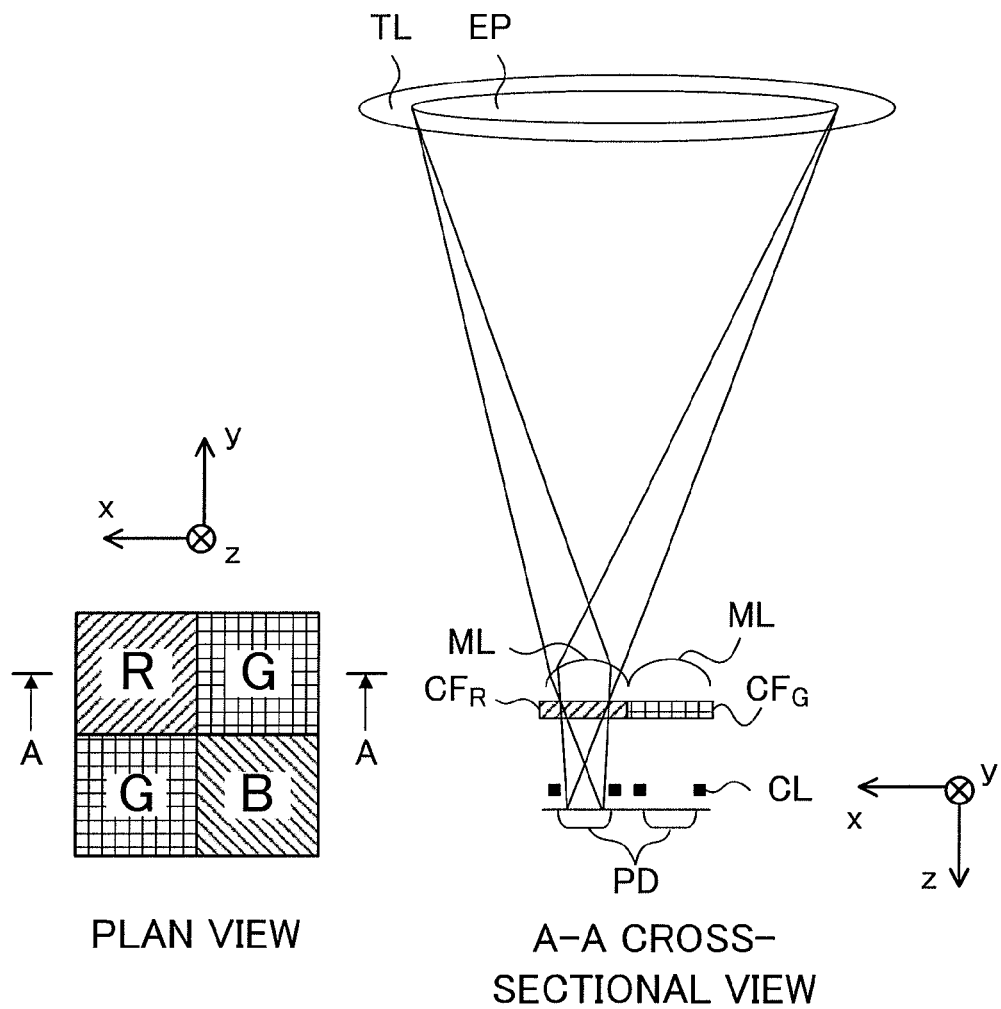
FIGS. 9A and 9B are a plan view and a cross-sectional view, respectively, of an image pickup pixel of an image pickup element in the third embodiment and a fourth embodiment.

FIGS. 9A and 9B illustrate the arrangement and the structure of the image pickup pixels. FIG. 9A is a plan view of the image pickup pixels arranged in two columns and two rows. As generally known, in the Bayer array, G pixels are arranged in a diagonal direction and an R pixel and a B pixel are arranged at the other two pixel positions. The structure of the two columns and the two rows is repeatedly arranged.

FIG. 9B is a cross-sectional view illustrating a section A-A of FIG. 9A. Symbol ML denotes an on-chip micro lens disposed on the front of each pixel, symbol $CF_R$ denotes an R (Red) color filter, and symbol $CF_G$ denotes a G (Green) color filter. Symbol PD denotes a photoelectric conversion portion of the CMOS sensor which is schematically illustrated, and symbol CL denotes a wiring layer to form a signal line configured to transmit various signals in the CMOS sensor. Symbol TL denotes an image pickup optical system (an image pickup lens) which is schematically illustrated.

The on-chip micro lens ML of each image pickup pixel and the photoelectric conversion portion PD are configured so as to capture, as effectively as possible, a light beam passing through the image pickup optical system TL. In other words, an exit pupil EP of the image pickup optical system TL, and the photoelectric conversion portion PD have a conjugate relation to each other by the micro lens ML, and the photoelectric conversion portion PD is designed to have a large effective area. While the incident light beam on the G pixel is described in FIG. 9B, the R pixel and the B (blue) pixel also have the same structure. Accordingly, the exit pupil EP corresponding to each of the image pickup pixels R, G, and B has a large diameter, and the light beam from an object is effectively captured to improve a signal to noise ratio (S/N) of an image signal.

Figures 10A, 10B:
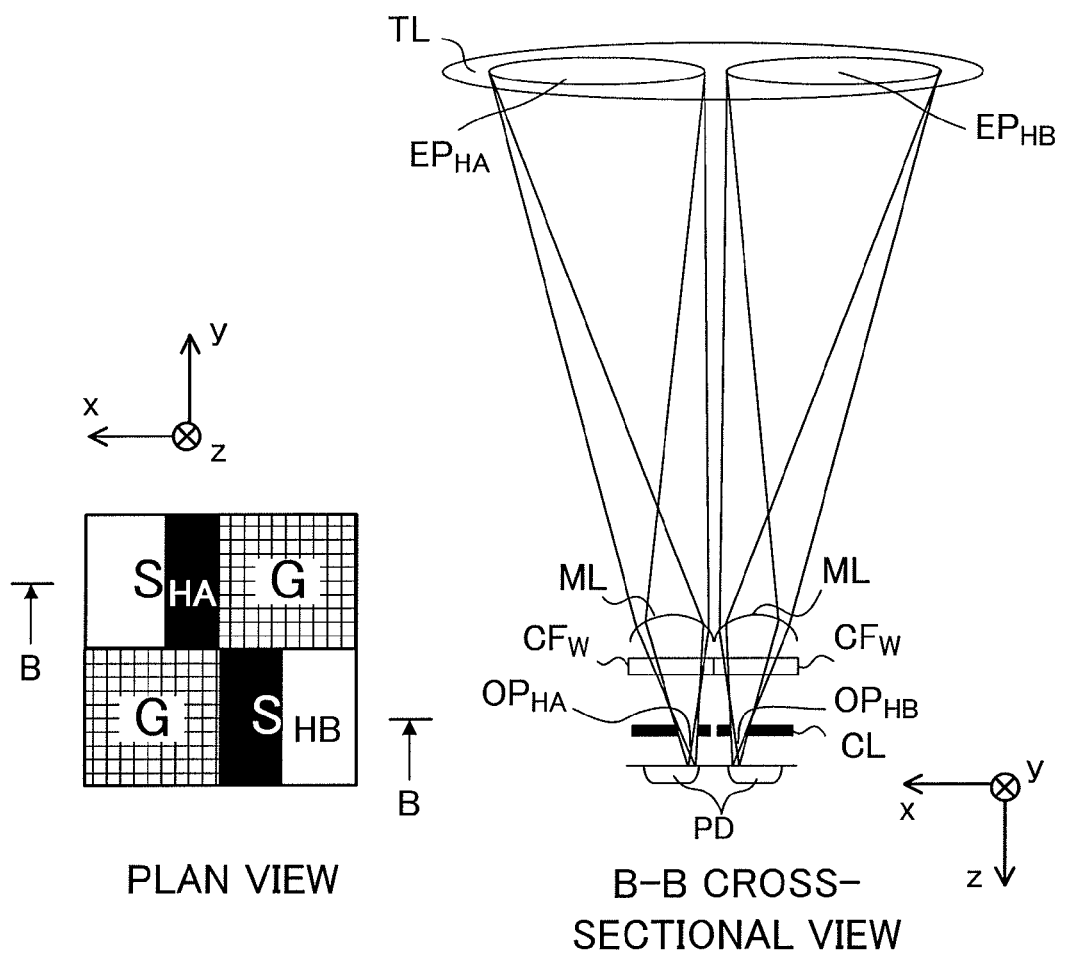
FIGS. 10A and 10B are a plan view and a cross-sectional view, respectively, of a focus detection pixel of the image pickup element in the third and fourth embodiments.

FIGS. 10A and 10B illustrate the arrangement and the structure of the focus detection pixel to perform the pupil division in a horizontal direction (an x direction) of the image pickup optical system TL (the image pickup lens). The "horizontal direction (x direction)" as used in this embodiment means a direction along a straight line which is orthogonal to an optical axis and extends horizontally when the camera is held such that the optical axis of the image pickup optical system TL is horizontal. FIG. 10A is a plan view of pixels of two columns and two rows including the focus detection pixels. When obtaining an image signal for use in recording or viewing, a main component of brightness information is obtained by the G pixels. Since the image recognition characteristics of human are sensitive to brightness information, image deterioration is easy to be recognized when the G pixel is defective. On the other hand, since the visual perception of human is insensitive to color information, image deterioration is difficult to be recognized when the R and B pixels, which are pixels configured to obtain color information (color difference information), are used even if the pixel to obtain the color information is defective to some extent. Therefore, in this embodiment, the G pixels of the two columns and the two rows remain as the image pickup pixels and the R and B pixels are replaced by the focus detection pixels. In FIG. 10A, the focus detection pixels are denoted by symbols $S_{HA}$ and $S_{HB}$.

FIG. 10B is a cross-sectional view illustrating a section B-B in FIG. 10A. The micro lens ML and the photoelectric conversion portion PD have the same structures as those of the image pickup pixels illustrated in FIG. 9B. Since signals of the focus detection pixels are not used for generating an image in this embodiment, a transparent film $CF_W$ (White) is placed instead of a color filter for separating colors. In order to perform the pupil division with the image pickup element 722, openings of the wiring layer CL are eccentric with respect to the center lines of the corresponding micro lenses MLs in one direction (in the x direction). More specifically, since an opening $OP_{HA}$ of the pixel $S_{HA}$ is eccentric rightward (in a −x direction), the pixel $S_{HA}$ receives a light beam that has passed through a left-side exit pupil $EP_{HA}$ of the image pickup optical system TL. Similarly, since an opening $OP_{HB}$ of the pixel $S_{HB}$ is eccentric leftward (in a +x direction), the pixel $S_{HB}$ receives a light beam that has passed through a right-side exit pupil $EP_{HB}$ of the image pickup optical system TL. The pixels $S_{HA}$ are regularly arranged in the horizontal direction (in the x direction), and an object image obtained by the pixels $S_{HA}$ is defined as an A image. Similarly, the pixels $S_{HB}$ are regularly arranged in the horizontal direction (in the x direction), and the object image obtained by the pixels $S_{HB}$ is defined as a B image. The calculation of relative positions of the A image and the B image allows detecting a focus shift amount (a defocus amount) of the object image.

While, in the pixels $S_{HA}$ and $S_{HB}$, it is possible to perform the focus detection for an object which has a brightness distribution in the x direction of a shooting screen, e.g. a vertical line (a line in a y direction), it is impossible to perform the focus detection for a horizontal line (a line in the x direction) which has a brightness distribution in a vertical direction (the y direction). In this embodiment, in order to make it possible to perform the focus detection for the latter, pixels configured to perform the pupil division in a vertical direction (the y direction) of the image pickup optical system TL are also provided.

FIGS. 11A and 11B illustrate the arrangement and the structure of the focus detection pixels to perform the pupil division in the vertical direction (the y direction) of the image pickup optical system TL. The "vertical direction (the y direction)" as used in this embodiment means a direction along a straight line which is orthogonal to the optical axis and extends vertically when the camera is held such that the optical axis of the image pickup optical system TL is horizontal. FIG. 11A is a plan view of pixels of two columns and two rows including the focus detection pixels, and as in the case of FIG. 10A, the G pixels remain to be image pickup pixels and the R and B pixels are the focus detection pixels. In FIG. 10A, the focus detection pixels are denoted by symbols $S_{VC}$ and $S_{VD}$.

FIG. 11B is a cross-sectional view illustrating a section C-C of FIG. 11A. In contrast to the pixels of FIG. 10B having the structure to divide the pupil in the horizontal direction (the x direction), the pixels of FIG. 11B have a structure to divide the pupil in the vertical direction (the y direction). The structure of other pixels of FIG. 11B is the same as that of FIG. 10B. That is, since an opening $OP_{VCc}$ of a pixel $S_{VC}$ is eccentric downward (in a −y direction), the pixel $S_{VC}$ receives a light beam that has passed through an upper-side (+y direction) exit pupil $EP_{VC}$ of the image pickup optical system TL. Similarly, since an opening $OP_{VD}$ of a pixel $S_{VC}$, is eccentric upward (in a +y direction), the pixel $S_{VC}$, receives a light beam that has passed through a right exit pupil $EP_{VD}$ of the image pickup optical system TL. The pixels $S_{VC}$ are arranged regularly in the vertical direction (the y direction), and an object image obtained by these pixels (pixel group) is defined as a C image. Similarly, the pixels $S_{VD}$ are arranged regularly in the vertical direction (the y direction), and the object image obtained by these pixels (pixel group) is defined as a D image. The detection (calculation) of a relative position between the C image and the D image allows detecting a focus shift amount (a defocus amount) of the object image.

In addition, as the difference between an eccentricity amount of the opening $OP_{VC}$ of the pixel $S_{VC}$ and that of the opening $OP_{VD}$ of the pixel $S_{VD}$ is larger, the sensitivity with respect to the defocusing becomes higher and the focus detection accuracy is improved. In contrast, when a large amount of defocusing occurs, an image shift amount becomes large and the maximum defocus range in which the focus detection can be performed relatively becomes small. The arrangement of either of the focus detection pixels for horizontal-direction detection or those for vertical-direction detection illustrated in FIGS. 10A, 10B, 11A, and 11B, which are focus detection systems having different characteristics, enables an improvement in focusing accuracy.

Figure 12:
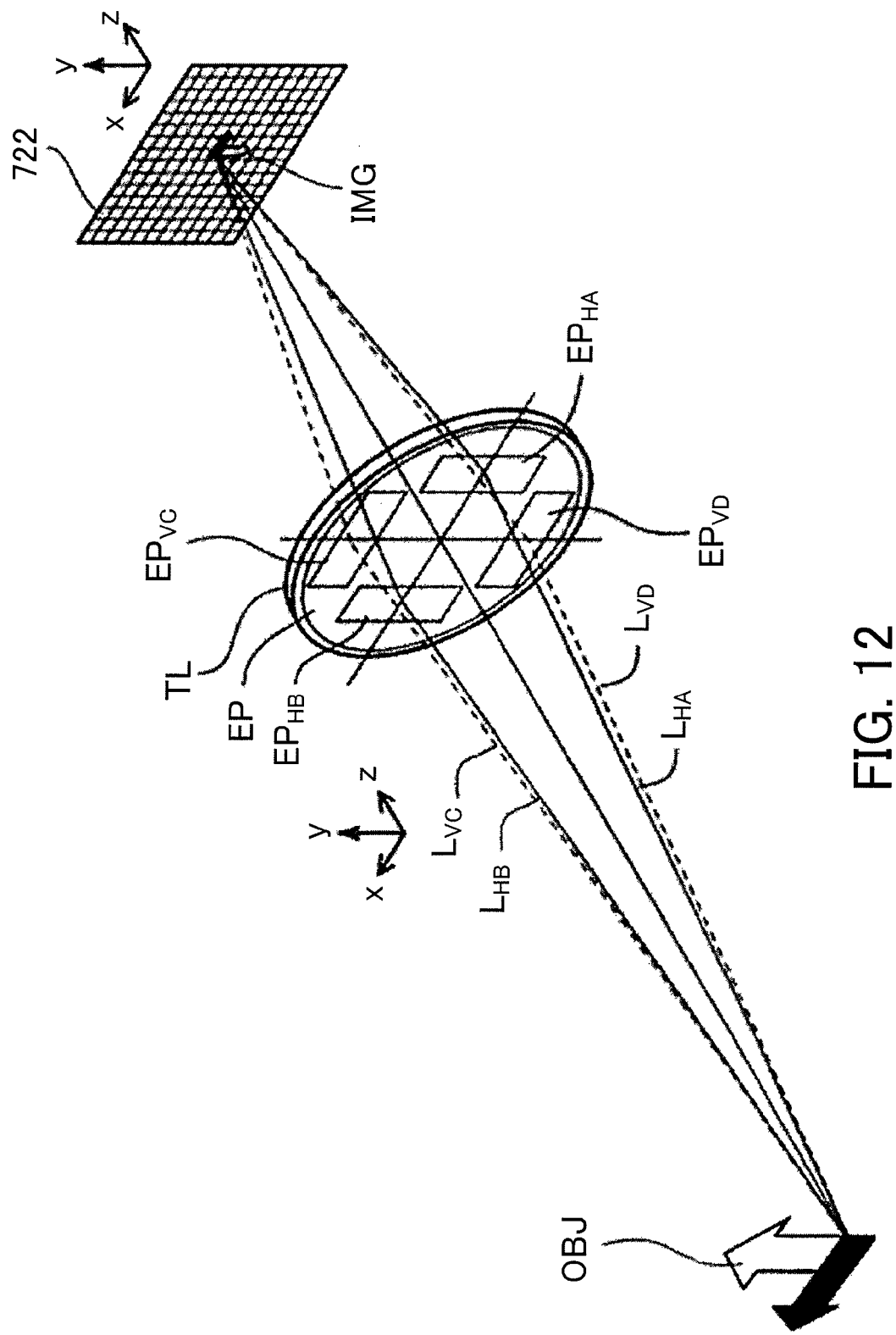
FIG. 12 is a diagram conceptually explaining a situation in which a pupil of the image pickup element in the third and fourth embodiments is divided.

FIG. 12 is a diagram conceptually explaining a pupil division situation of the image pickup element 722 in this embodiment. In FIG. 12, symbol TL denotes an image pickup lens, reference numeral 722 denotes the image pickup element, symbol OBJ denotes an object, and symbol IMG denotes an object image. As described with reference to FIGS. 9A and 9B, the image pickup pixel receives a light beam that has passed through the entire region of the exit pupil EP of the image pickup optical system TL. On the other hand, as described with reference to FIGS. 10A, 10B, 11A, and 11B, the focus detection pixels have a pupil dividing function.

More specifically, the pixel $S_{HA}$ illustrated in FIG. 10A and 10B receives a light beam that has passed through a pupil of a +x direction side, that is, a light beam $L_{HA}$ that has passed through the pupil $EP_{HA}$ illustrated in FIG. 12. Similarly, the pixels $S_{HB}$, $S_{VC}$, and $S_{VD}$ receive light beams $L_{HB}$, $L_{VC}$, and $L_{VD}$ that have passed through pupils $EP_{HB}$, $EP_{VC}$, and $EP_{VD}$, respectively. The focus detection pixels are distributed over the entire region of the image pickup element 722, and therefore the focus detection can be performed by the imaging-plane phase-difference AF. Moreover, since the focus detection can be performed over the entire imaging region, a result of the imaging-plane phase-difference AF can be obtained in synchronization with the contrast focus detection unit 730 in the same ranging frame (a focus detection frame) at an arbitrary position set by a user.

While a focus detection method using the imaging-plane phase-difference AF is described as an example in this embodiment, applicable focus detection methods are not limited to this as long as they are focus detection methods which do not use a contrast evaluation value. For instance, a focus detection method which employs a phase difference detection at the outside or active ranging may also be adopted. In this embodiment, focus detection control and frame rate switching performed when an AF start button is operated will be mainly described and other description will be omitted.

Figure 8:
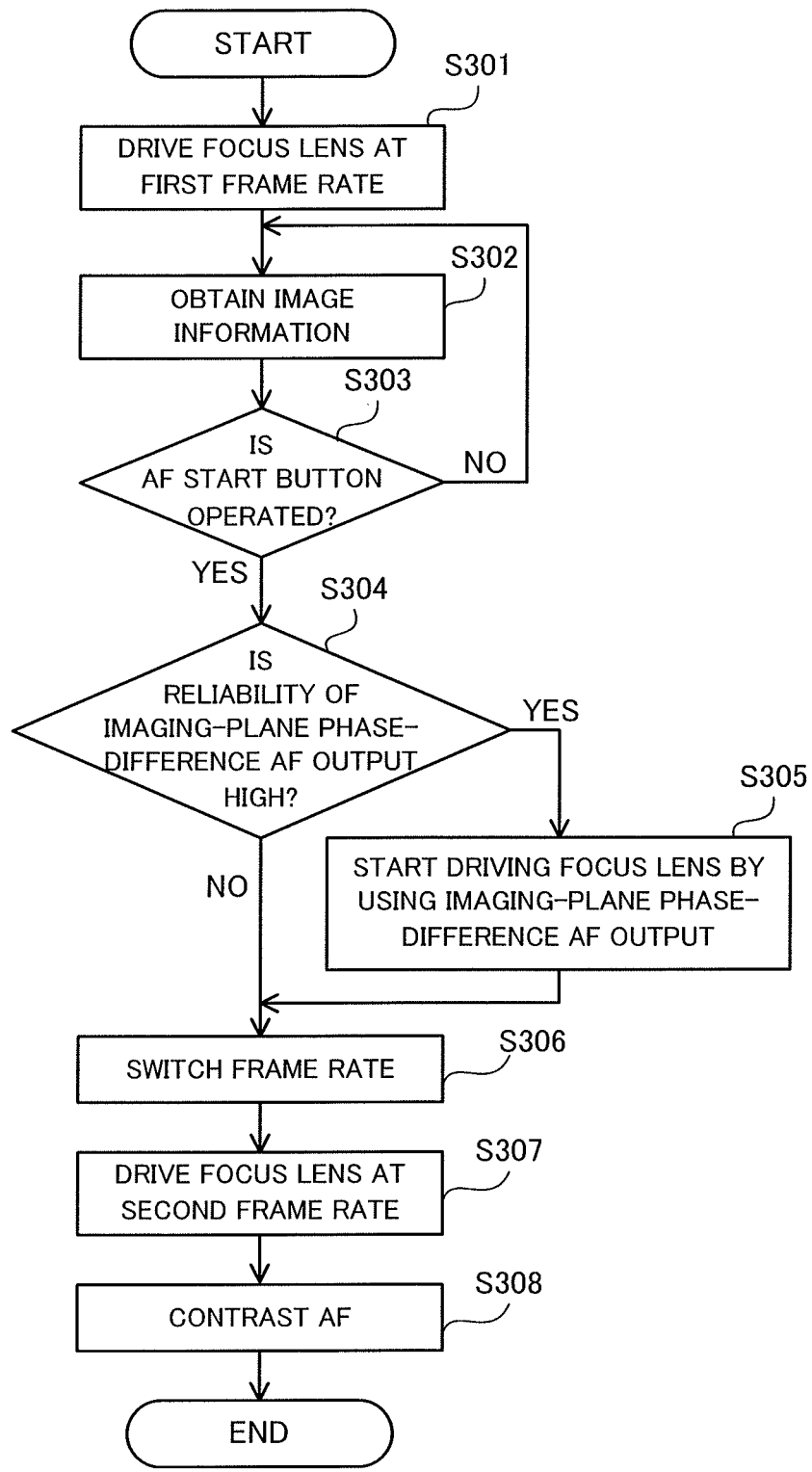
FIG. 8 is a flowchart of a method of controlling the image pickup apparatus (a focus detection method) in the third embodiment.

Next, referring to FIG. 8, the control of the image pickup apparatus in this embodiment will be described. FIG. 8 is a flowchart illustrating the control of the image pickup apparatus in this embodiment. A description will be given here of a series of operations triggered by an operation of the AF start button performed at the time in a state in which a live-view image is displayed with the image pickup element 722 being driven at a low-speed frame rate before the AF start button is operated. Each step of FIG. 8 is performed mainly by the imaging-plane phase-difference focus detection unit 729, the contrast focus detection unit 730, or the image pickup element drive circuit 723 based on a command (an instruction) of the camera microcomputer 725.

First, at step S301, when the AF start button (an operating SW 727) is not operated by a user, the camera microcomputer 725 controls the image pickup element drive circuit 723 so as to drive the image pickup element 722 at a low-speed frame rate. In this situation, an image processed by the image processing circuit 724 is displayed on the display 726 at a low-speed frame rate (live-view display). Subsequently, at step S302, the imaging-plane phase-difference focus detection unit 729 obtains image information for the imaging-plane phase-difference AF. At this time, the camera microcomputer 725 obtains image information corresponding to a set ranging frame (a focus detection frame), which is not illustrated in the drawing, from the imaging-plane phase-difference focus detection unit 729. A contrast evaluation value, as well as the image information, may be obtained.

Subsequently, at step S303, the camera microcomputer 725 determines whether or not the user operates the AF start button (the SW 727). The camera microcomputer 725 starts the focus control (the AF control) in response to an operation of the AF start button. When the camera microcomputer 725 determines that the AF start button is not operated, it repeats steps S302 and S303. That is, the camera microcomputer 725 continues to obtain the image information from the imaging-plane phase-difference focus detection unit 729. On the other hand, when the camera microcomputer 725 determines that the AF start button is operated, the flow proceeds to step S304.

At step S304, the camera microcomputer 725 determines whether or not the latest image information (a focus detection signal which is an imaging-plane phase-difference AF output) obtained at step S302 has a reliability. The reliability of the image information is determined using, for example, the S level (SELECT LEVEL) value disclosed in JP 2007-052072. When the camera microcomputer 725 determines that the reliability of the imaging-plane phase-difference AF output is low, the flow proceeds to step S306. On the other hand, when the camera microcomputer 725 determines that the reliability of the imaging-plane phase-difference AF output is high, the flow proceeds to step S305.

At step S305, the camera microcomputer 725 starts driving the focus lens (the third lens unit 704) from an in-focus position obtained as a result of the imaging-plane phase-difference AF to a position apart from the in-focus position by a predetermined range of distance based on the image information obtained at step S302. After that, at step S306, the camera microcomputer 725 performs switching processing for switching a frame rate to a high-speed frame rate in order to perform the contrast AF control at a high speed. When the camera microcomputer 725 determines, at step S304, that the reliability of the latest image information which is obtained before the frame rate is switched is high, it switches the frame rate while moving the focus lens to a position obtained from the image information. The position to which the focus lens is moved (the position apart from the in-focus position by a predetermined range of distance obtained based on the image information) corresponds to a position at which a scanning is started by the contrast AF to be performed at step S308. When an approximate in-focus position is known in advance, an AF period of time can be shortened by starting a scanning operation from the periphery of an estimated in-focus position, instead of a scanning operation over the entire movable range of the focus lens. In this embodiment, the predetermined range of distance is set to a value obtained experimentally or experientially so that the peak of the contrast evaluation value can be satisfactorily detected when the scanning operation is performed at the periphery of the in-focus position obtained based on the image information. Although an output signal from the image pickup element 722 cannot be obtained during the frame rate switching, in this embodiment, the focus lens is driven to the scanning start position by using the image information which is obtained before the frame rate is switched. Performing this control allows moving the focus lens to the scanning start position based on the in-focus position determined by the imaging-plane phase-difference AF without waiting for the completion of the frame rate switching, and therefore a period of time required for the focus detection can be reduced.

At step S307, the camera microcomputer 725 controls the image pickup element drive circuit 723 so as to drive the image pickup element 722 at a high-speed frame rate. At this time, the image processed by the image processing circuit 724 is displayed on the display 726 at a high-speed frame rate. Subsequently, at step S308, the contrast focus detection unit 730 performs the focus detection by the contrast method at a high-speed frame rate. In this situation, the camera microcomputer 725 performs the scanning operation to move the focus lens while obtaining the contrast evaluation value. As described above, the start position of the scanning operation is determined based on the in-focus position obtained using the image information which is obtained before the frame rate is switched. The focus lens is moved to a position at which the contrast evaluation value reaches a peak based on a result of the scanning, and then the AF processing is completed.

As described above, the camera microcomputer 725 changes a frame rate of the image pickup element 722 from the low-speed frame rate to the high-speed frame rate when the focus control is performed. In this case, when the reliability of the image information (the focus detection signal) determined by the imaging-plane phase-difference AF is high, the camera microcomputer 725 determines the scanning start position of the focus control based on the image information. After that, the camera microcomputer 725 drives the focus lens to the scanning start position while performing the frame rate switching.

According to the flowchart of FIG. 8, at the beginning of the focus detection, the camera microcomputer 725 starts driving the focus lens to the scanning start position based on a focus detection result (an output result of the imaging-plane phase-difference AF in this embodiment) obtained without using the contrast evaluation value. The camera microcomputer 725 switches the low-speed frame rate to the high-speed frame rate in parallel with the drive of the focus lens. This enables to perform a high-speed and smooth focus control.

In some cases, the low-speed frame rate may be switched to the high-speed frame rate while the focus lens is driven to the scanning start position obtained based on the in-focus position determined by the imaging-plane phase-difference AF. In these cases, this embodiment enables to transfer to the focus control by the contrast AF without stopping the drive of the focus lens. This allows more smooth focus control at higher speed.

Fourth Embodiment

Figure 13:
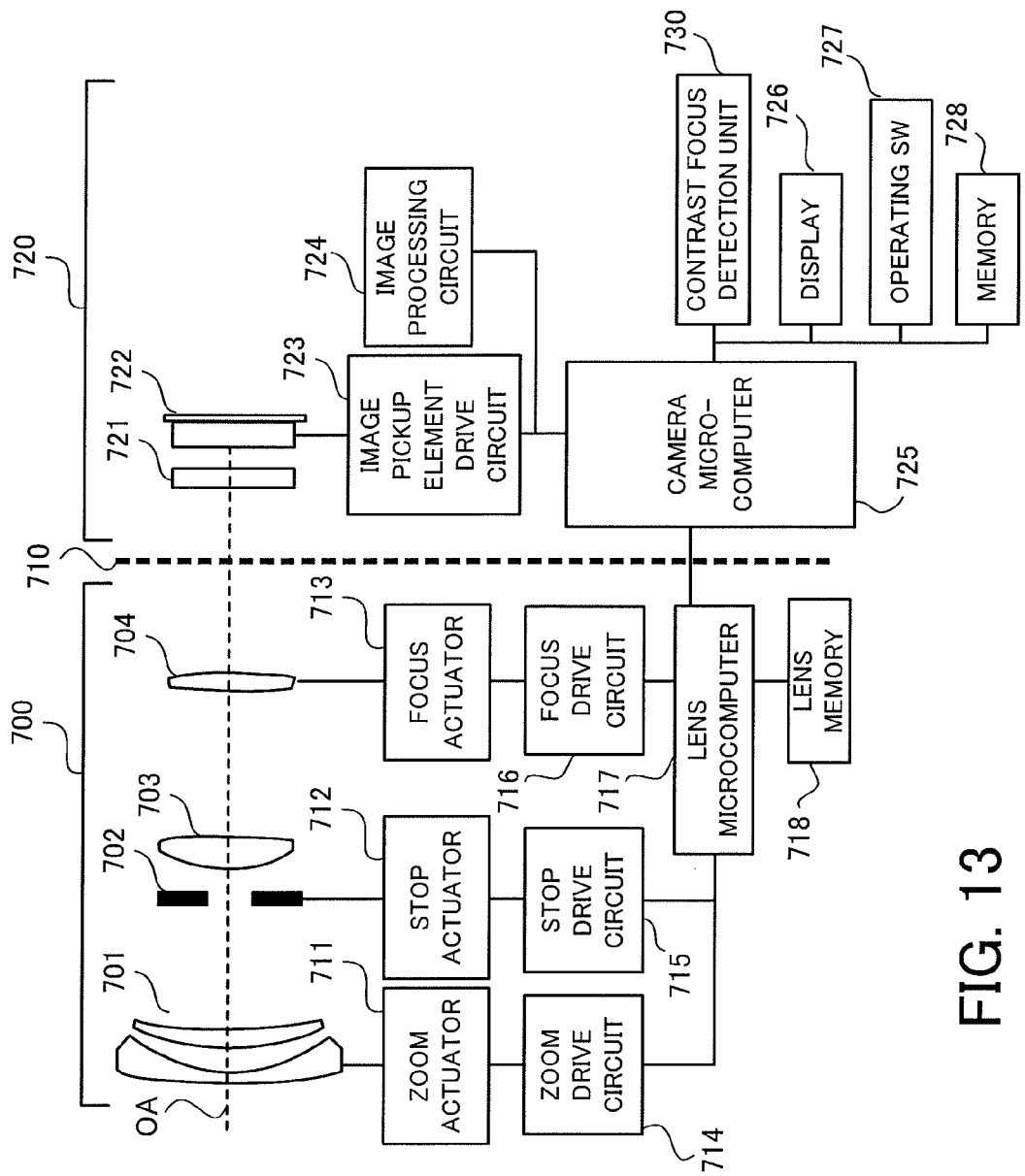
FIG. 13 is a block diagram illustrating the configuration of an image pickup apparatus (an image pickup system) in the fourth embodiment.

Next, referring to FIG. 13, the configuration of an image pickup apparatus in the fourth embodiment of the present invention will be described. FIG. 13 is a block diagram illustrating the configuration of the image pickup apparatus (an image pickup system) in this embodiment. The image pickup apparatus of this embodiment illustrated in FIG. 13 is different from that of the third embodiment illustrated in FIG. 7 in that it is not provided with the imaging-plane phase-difference focus detection unit 729. Since other configuration is the same as the configuration of the image pickup apparatus of the third embodiment, the description thereof will be omitted.

The camera microcomputer 725 and the contrast focus detection unit 730 perform the above-described scanning operation to detect a position of the focus lens at which a contrast evaluation value reaches a peak to perform the focus control. The contrast AF control, because of its property, requires the focus lens to once leave a position near a peak of the contrast evaluation value in order to detect the peak when the focus lens is located at the position near the peak at the time of the start of the focus control. The control in which the focus lens leaves the peak position of a contrast evaluation value is a control which does not require the contrast evaluation value. This embodiment relates to a control of switching the frame rate during this control.

Figure 14:
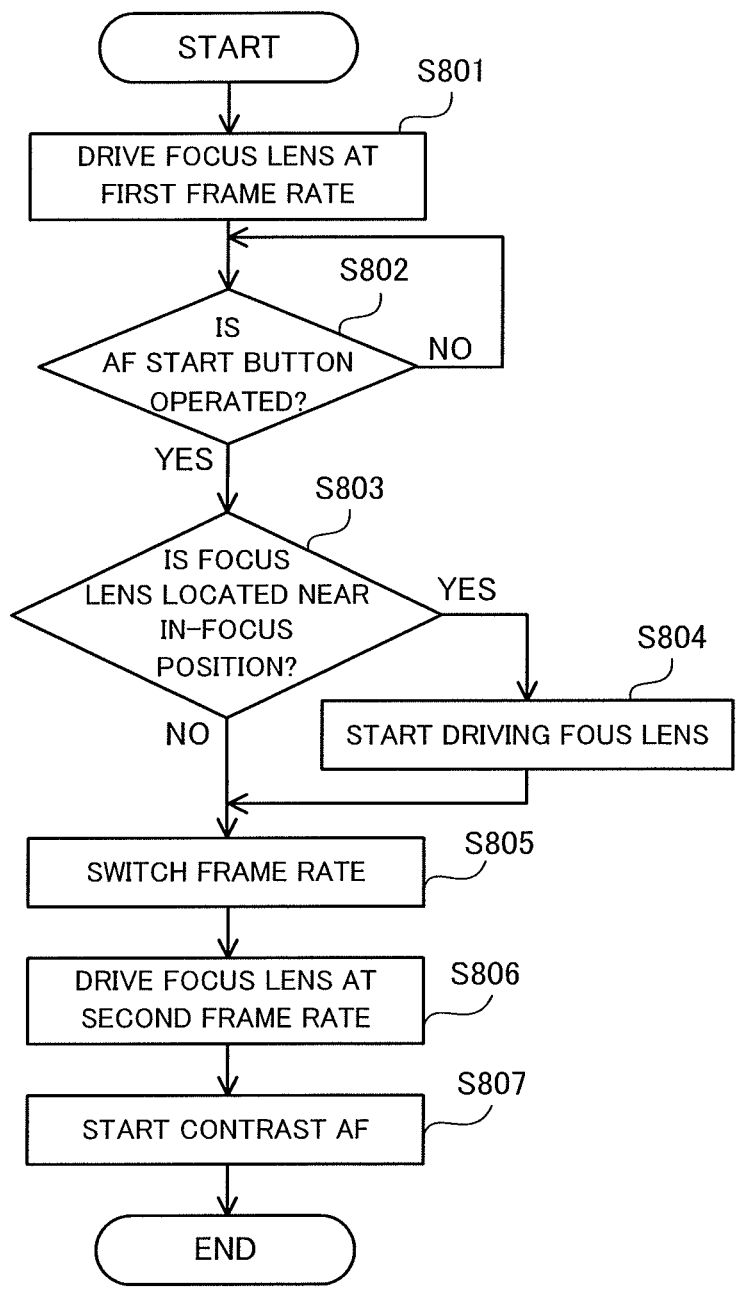
FIG. 14 is a flowchart of a method of controlling the image pickup apparatus (a focus detection method) in the fourth embodiment.

Next, referring to FIG. 14, the control of the image pickup apparatus in this embodiment will be described. FIG. 14 is a flowchart illustrating the control of the image pickup apparatus in this embodiment. A description will be given here of a series of operations triggered by an operation of the AF start button performed at the time in a state in which a live-view image is displayed with the image pickup element 722 being driven at a low-speed frame rate before the AF start button is operated. Each step of FIG. 14 is performed mainly by the contrast focus detection unit 730 or the image pickup element drive circuit 723 based on a command (an instruction) of the camera microcomputer 725.

First, at step S801, when the AF start button (the operating SW 727) is not operated by a user, the camera microcomputer 725 controls the image pickup element drive circuit 723 so as to drive the image pickup element 722 at a low-speed frame rate. In this situation, an image processed by the image processing circuit 724 is displayed on the display 726 at a low-speed frame rate (live-view display).

Subsequently, at step S802, the camera microcomputer 725 determines whether or not the user operates the AF start button (the SW 727). When the camera microcomputer 725 determines that the AF start button is not operated, it repeats step S802. On the other hand, when the camera microcomputer 725 determines that the AF start button is operated, the flow proceeds to step S803. The camera microcomputer 725 continues to obtain contrast evaluation values until the AF start button is operated.

After that, at step S803, the camera microcomputer 725 determines whether or not the focus lens (the third lens unit 704) is located a near in-focus position (performs a near in-focus-position determination). For instance, when the latest contrast evaluation value is higher than a predetermined threshold value, the camera microcomputer 725 determines that the focus lens is located at the near in-focus position. When the camera microcomputer 725 determines, at step S803, that the focus lens is not located at the near in-focus position, the flow proceeds to step S805. On the other hand, when the camera microcomputer 725 determines that the focus lens is located at the near in-focus position, the flow proceeds to step S804.

When the camera microcomputer 725 determines, at step S803, that the focus lens is located at the near in-focus position, it starts driving the focus lens at step S804 so as to move the focus lens to a position apart from the near in-focus position by a predetermined range of distance.

At step S805, the camera microcomputer 725 performs the switching processing for switching a frame rate to a high-speed frame rate in order to perform the contrast AF control at high speed. When the camera microcomputer 725 determines, at step S803, that the focus lens is located at the near in-focus position, it switches the frame rate while moving the focus lens to the position apart from the near in-focus position by the predetermined range of distance. The position to which the focus lens is moved (the position apart from the near in-focus position by the predetermined range of distance) corresponds to a position at which a scanning is started by the contrast AF to be performed at step S807. In this embodiment, the predetermined range of distance is set to a value obtained experimentally or experientially so that the peak of the contrast evaluation value can be satisfactorily detected when the scanning operation is performed at the periphery of the in-focus position. Although an output signal from the image pickup element 722 cannot be obtained during the frame rate switching, in this embodiment, whether or not the focus lens is located at the near in-focus position is determined based on the contrast evaluation value obtained before the frame rate switching is performed. When the camera microcomputer 725 determines that the focus lens is located at the near in-focus position, it drives the focus lens to the position apart from the near in-focus position by the predetermined range of distance so that the peak of the contrast evaluation value can be detected. Performing this control allows moving the focus lens from the position determined to be located near the in-focus position to the scanning start position without waiting for the completion of the frame rate switching, and therefore a period of time required for the focus detection can be reduced.

Subsequently, at step S806, the camera microcomputer 725 controls the image pickup element drive circuit 723 so as to drive the image pickup element 722 at a high-speed frame rate. In this situation, an image processed by the image processing circuit 724 is displayed on the display 726 at a high-speed frame rate. Subsequently, at step S807, the contrast focus detection unit 730 performs the focus detection by the contrast method at a high-speed frame rate. In this focus detection, the camera microcomputer 725 performs a scanning operation in which the focus lens is moved while obtaining contrast evaluation values. As described above, a start position of the scanning operation is determined based on the position determined, before the frame rate switching, to be located near the in-focus position. The focus lens is moved to a position at which the contrast evaluation value reaches a peak based on a result of the scanning, and then the AF processing is completed.

As described above, the camera microcomputer 725 determines whether or not the focus lens is located at the near in-focus position when it is to perform the focus control. When the camera microcomputer 725 determines that the focus lens is located at the near in-focus position, it moves the focus lens from the near in-focus position while switching the frame rate of the image pickup element 722 from the low-speed frame rate to the high-speed frame rate. When for example the contrast evaluation value is higher than a predetermined threshold value, the camera microcomputer 725 determines that the focus lens is located at the near in-focus position.

According to the flowchart of FIG. 14, at the beginning of the focus detection, the camera microcomputer 725 starts driving the focus lens without using a focus evaluation value obtained based on a contrast evaluation value. Then, the camera microcomputer 725 switches the frame rate from the low-speed frame rate to the high-speed frame rate while driving the focus lens. This enables to perform a high-speed focus detection control.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The first and second embodiments can provide an image pickup apparatus capable of performing high-speed shooting with suppressed consumption current and temperature rise, a method of controlling the image pickup apparatus, and a non-transitory computer-readable storage medium. The third and fourth embodiments can provide an image pickup apparatus capable of displaying a desired live view while performing high-speed focus detection, a method of controlling the image pickup apparatus, and a non-transitory computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131460, filed on Jun. 24, 2013, Japanese Patent Application No. 2013-096472, filed on May 1, 2013, and Japanese Patent Application No. 2014-035372, filed on Feb. 26, 2014, which are hereby incorporated by reference herein in their entirety.

What is claimed is:

1. An image pickup apparatus comprising:
an image pickup element configured to photoelectrically convert an optical image; and
a controller configured to control a drive of a focus lens based on a signal outputted from the image pickup element and configured to control a frame rate to drive the image pickup element,
wherein the controller is configured to:
detect an in-focus position based on a signal outputted from the image pickup element which is driven at a first frame rate, and
switch the frame rate of the image pickup element to a second frame rate lower than the first frame rate while performing a first operation to drive the focus lens to the in-focus position.

2. The image pickup apparatus according to claim 1, further comprising a photometry unit configured to perform photometry processing based on a signal outputted from the image pickup element,
wherein the photometry unit is configured to perform the photometry processing while the first operation is performed.

3. The image pickup apparatus according to claim 2,
wherein the photometry unit is configured to perform the photometry processing after the controller switches the frame rate of the image pickup element to the second frame rate.

4. The image pickup apparatus according to claim 2,
wherein the controller is configured to perform an exposure control to shoot a still image based on a result of the photometry processing by the photometry unit.

5. The image pickup apparatus according to claim 2,
wherein the controller is configured to permit shooting processing after completing the first operation and the photometry processing by the photometry unit.

6. The image pickup apparatus according to claim 2,
wherein the photometry unit is configured to perform the photometry processing based on a signal corresponding to a focus detection region used to detect the in-focus position.

7. The image pickup apparatus according to claim 1,
wherein the controller is configured to:
drive the image pickup element at the second frame rate until a predetermined operation to instruct focusing is performed, and
switch the frame rate of the image pickup element to the first frame rate in response to the predetermined operation.

8. The image pickup apparatus according to claim 1,
wherein the controller is configured to:
obtain a focus signal based on a signal outputted from the image pickup element while moving the focus lens, and
detect a peak of the focus signal to detect the in-focus position.

9. The image pickup apparatus according to claim 1, further comprising a photometry unit configured to perform photometry processing based on a signal outputted from the image pickup element,
wherein the photometry unit is configured to perform the photometry processing after the first operation is completed.

10. The image pickup apparatus according to claim 9,
wherein the photometry unit is configured to perform the photometry processing after the controller switches the frame rate of the image pickup element to the second frame rate.

11. A method of controlling an image pickup apparatus, the method comprising the steps of:
converting photoelectrically an optical image in an image pickup element;
detecting an in-focus position based on a signal outputted from the image pickup element driven at a first frame rate;
performing a first operation to drive a focus lens to the in-focus position; and
switching a frame rate of the image pickup element to a second frame rate lower than the first frame rate while performing the first operation.

12. A non-transitory computer-readable storage medium storing a program which causes a computer to execute a process comprising the steps of:
converting photoelectrically an optical image in an image pickup element;
detecting an in-focus position based on a signal outputted from the image pickup element driven at a first frame rate;
performing a first operation to drive a focus lens to the in-focus position; and
switching a frame rate of the image pickup element to a second frame rate lower than the first frame rate while performing the first operation.

13. An image pickup apparatus comprising:
an image pickup element configured to photoelectrically convert an optical image; and
a controller configured to control a drive of a focus lens based on a signal outputted from the image pickup element and configured to control a frame rate,
wherein the controller is configured to:
detect an in-focus position based on a signal outputted from the image pickup element at a first frame rate,
perform a first operation to drive the focus lens to the in-focus position; and
switch the frame rate to a second frame rate lower than the first frame rate,
wherein the controller is configured to start the first operation before completion of switching the frame rate to the second frame rate.

14. The image pickup apparatus according to claim 13, further comprising a photometry unit configured to perform photometry processing based on a signal outputted from the image pickup element, wherein the photometry unit is configured to perform the photometry processing while the first operation is performed.

15. The image pickup apparatus according to claim 14, wherein the photometry unit is configured to perform the photometry processing after the controller switches the frame rate to the second frame rate.

16. The image pickup apparatus according to claim 14, wherein the controller is configured to perform an exposure control to shoot a still image based on a result of the photometry processing by the photometry unit.

17. The image pickup apparatus according to claim 14, wherein the controller is configured to permit shooting processing after completing the first operation and the photometry processing by the photometry unit.

18. The image pickup apparatus according to claim 14, wherein the photometry unit is configured to perform the photometry processing based on a signal corresponding to a focus detection region used to detect the in-focus position.

19. The image pickup apparatus according to claim 13, wherein the controller is configured to:
set the second frame rate until a predetermined operation to instruct focusing is performed, and
switch the frame rate to the first frame rate in response to the predetermined operation.

20. The image pickup apparatus according to claim 13, wherein the controller is configured to:
obtain a focus signal based on a signal outputted from the image pickup element while moving the focus lens, and
detect a peak of the focus signal to detect the in-focus position.

21. The image pickup apparatus according to claim 13, further comprising a photometry unit configured to perform photometry processing based on a signal outputted from the image pickup element,
wherein the photometry unit is configured to perform the photometry processing after the first operation is completed.

22. The image pickup apparatus according to claim 21, wherein the photometry unit is configured to perform the photometry processing after the controller switches the frame rate to the second frame rate.

23. A method of controlling an image pickup apparatus, the method comprising the steps of:
converting photoelectrically an optical image in an image pickup element;
detecting an in-focus position based on a signal outputted from the image pickup element at a first frame rate;
performing a first operation to drive a focus lens to the in-focus position; and
switching a frame rate to a second frame rate lower than the first frame rate,
wherein the first operation is started before completion of switching the frame rate to the second frame rate.

24. A non-transitory computer-readable storage medium storing a program which causes a computer to execute a process comprising the steps of:
converting photoelectrically an optical image in an image pickup element;
detecting an in-focus position based on a signal outputted from the image pickup element at a first frame rate;
performing a first operation to drive a focus lens to the in-focus position; and
switching a frame rate to a second frame rate lower than the first frame rate,
wherein the first operation is started before completion of switching the frame rate to the second frame rate.

* * * * *